US011652804B2

(12) United States Patent
Trieflinger et al.

(10) Patent No.: US 11,652,804 B2
(45) Date of Patent: May 16, 2023

(54) DATA PRIVACY SYSTEM

(71) Applicant: Robert Bosch GmbH, Stuttgart (DE)

(72) Inventors: Sven Trieflinger, Renningen (DE); Shalabh Jain, Pittsburgh, PA (US); Vadim Raskin, Stuttgart (DE)

(73) Assignee: ROBERT BOSCH GMBH

( * ) Notice: Subject to any disclaimer, the term of this patent is extended or adjusted under 35 U.S.C. 154(b) by 347 days.

(21) Appl. No.: 16/932,942

(22) Filed: Jul. 20, 2020

(65) Prior Publication Data

US 2022/0021660 A1 Jan. 20, 2022

(51) Int. Cl.
*H04L 9/40* (2022.01)
*H04L 9/32* (2006.01)
*H04L 9/08* (2006.01)

(52) U.S. Cl.
CPC ........ *H04L 63/0428* (2013.01); *H04L 9/0833* (2013.01); *H04L 9/3247* (2013.01)

(58) Field of Classification Search
CPC .............. H04L 63/0428; H04L 9/0833; H04L 9/3247
USPC ........................................................ 713/193
See application file for complete search history.

(56) References Cited

U.S. PATENT DOCUMENTS

| 7,401,233 | B2* | 7/2008 | Duri | H04L 63/10 |
| | | | | 713/193 |
| 8,473,756 | B2* | 6/2013 | Orsini | G06F 21/6209 |
| | | | | 713/193 |
| 11,032,062 | B2* | 6/2021 | Salomon | H04L 9/50 |
| 2016/0203086 | A1* | 7/2016 | Ng | G06F 21/6209 |
| | | | | 713/193 |
| 2018/0137264 | A1* | 5/2018 | Kurian | H04L 67/12 |
| 2018/0191695 | A1* | 7/2018 | Lindemann | H04L 63/0853 |
| 2020/0159930 | A1* | 5/2020 | Venkateswaran | G06F 21/606 |

OTHER PUBLICATIONS

WO 2016/048177, title: "Securely Exchanging Vehicular Sensor Information," by Bronk, Mateusz, see Figures 5, 6, 7, and corresponding text regarding such figures. (Year: 2016).*
I. Damgård, M. Keller, E. Larraia, V. Pastro, P. Scholl and N. P. Smart, "Practical Covertly Secure MPC for Dishonest Majority—Or: Breaking the SPDZ Limits," in Computer Security—ESORICS 2013, Berlin, 2013, 45 Pages.

(Continued)

*Primary Examiner* — Dant B Shaifer Harriman
(74) *Attorney, Agent, or Firm* — Dickinson Wright PLLC

(57) ABSTRACT

A backend computer and methods of using the backend computer are described. The method may comprise: receiving, at a first backend computer, sensor data associated with a vehicle; determining a labeling of the sensor data, comprising: determining personal data and determining non-personal data that is separated from the personal data, wherein each of the personal and non-personal data comprise labeled data, wherein the personal data comprises information relating to at least one identified or identifiable natural person; and performing via the personal data and the non-personal data that is separated from the personal data, at the first backend computer, data processing associated with collecting sensor data associated with the vehicle.

20 Claims, 15 Drawing Sheets

(56) References Cited

OTHER PUBLICATIONS

P. Mohassel and P. Rindal, "ABY3: A Mixed Protocol Framework for Machine Learning," in Proceedings of the 2018 ACM SIGSAC Conference on Computer and Communications Security, New York, NY, USA, 2018, 40 pages.

E. M. Songhori, S. U. Hussain, A. Sadeghi, T. Schneider and F. Koushanfar, "TinyGarble: Highly Compressed and Scalable Sequential Garbled Circuits," in 2015 IEEE Symposium on Security and Privacy, 2015, 18 pages.

D. Bogdanov, S. Laur and J. Willemson, "Sharemind: A Framework for Fast Privacy-Preserving Computations," in Proceedings of the 13th European Symposium on Research in Computer Security: Computer Security, Berlin, 2008, 24 pages.

A. Shamir, "How to Share a Secret," Commun. ACM, vol. 22, p. 612-613, 11 1979, 2 pages.

Website for "Intel SGX," [Available: https://www.intel.com/content/www/us/en/architecture-and-technology/software-guard-extensions.html. Downloaded: Apr. 7, 2021, 5 pages.

ARM, "ARM Security Technology—Building a Secure System usingTrustZone Technology," Industry Whitepaper, 108 pages.

P. Viola and M. Jones, "Rapid object detection using a boosted cascade of simple features," in Proceedings of the 2001 IEEE Computer Society Conference on Computer Vision and Pattern Recognition. CVPR 2001, 2001, 9 pages.

J. Redmon, S. Divvala, R. Girshick and A. Farhadi, "You Only Look Once: Unified, Real-Time Object Detection," in 2016 IEEE Conference on Computer Vision and Pattern Recognition (CVPR), 2016, 10 pages.

Rescorla et al., "The Transport Layer Security (TLS) Protocol Version 1.3", Aug. 2018, ISSN: 2070-1721, 160 pages.

I. Damgård, K. Damgård, K. Nielsen, P. S. Nordholt and T. Toft, "Confidential Benchmarking Based on Multiparty Computation," in Financial Cryptography and Data Security, Berlin, 2017, 18 pages.

\* cited by examiner

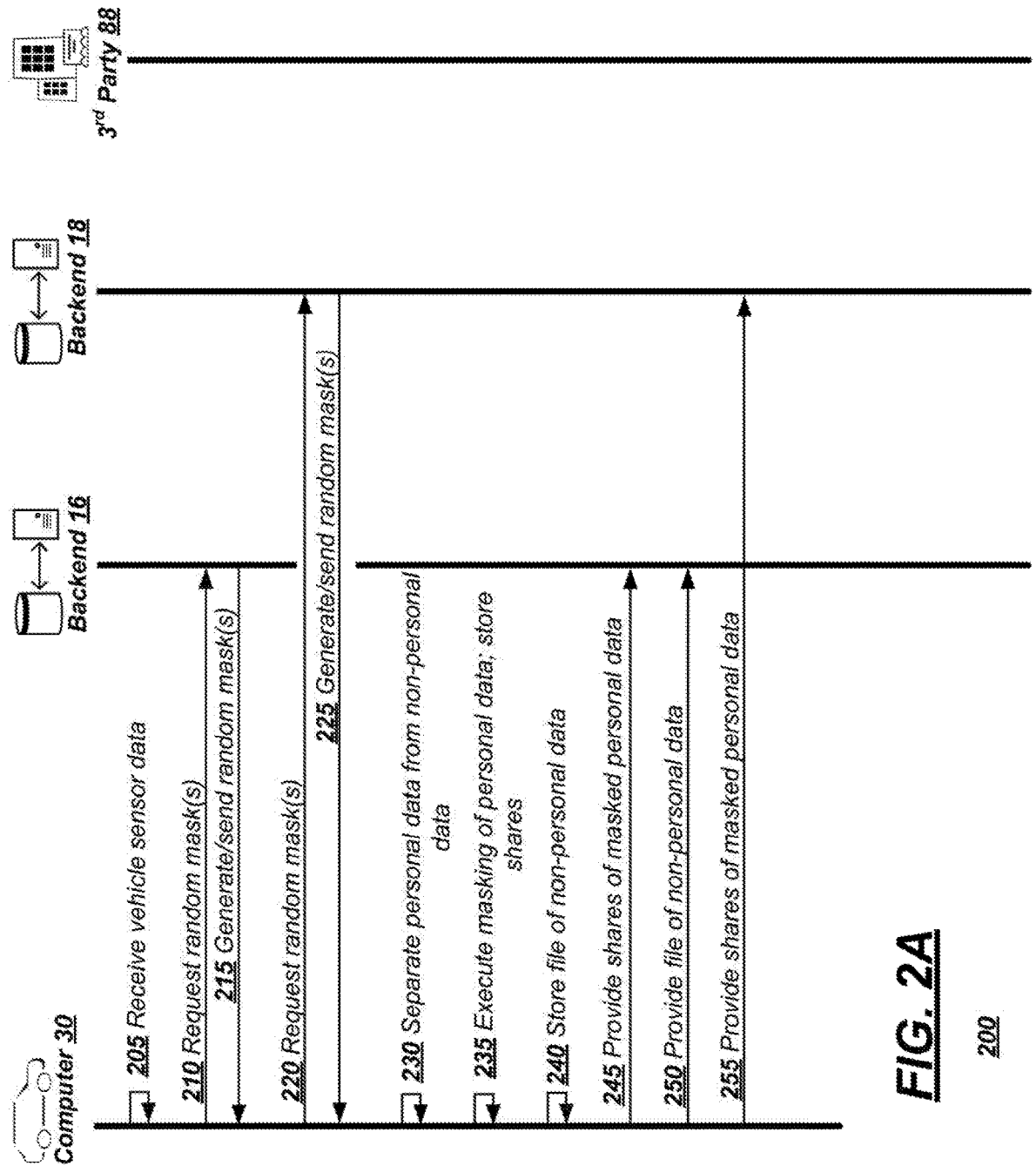

200 continued 200 continued 400 continued

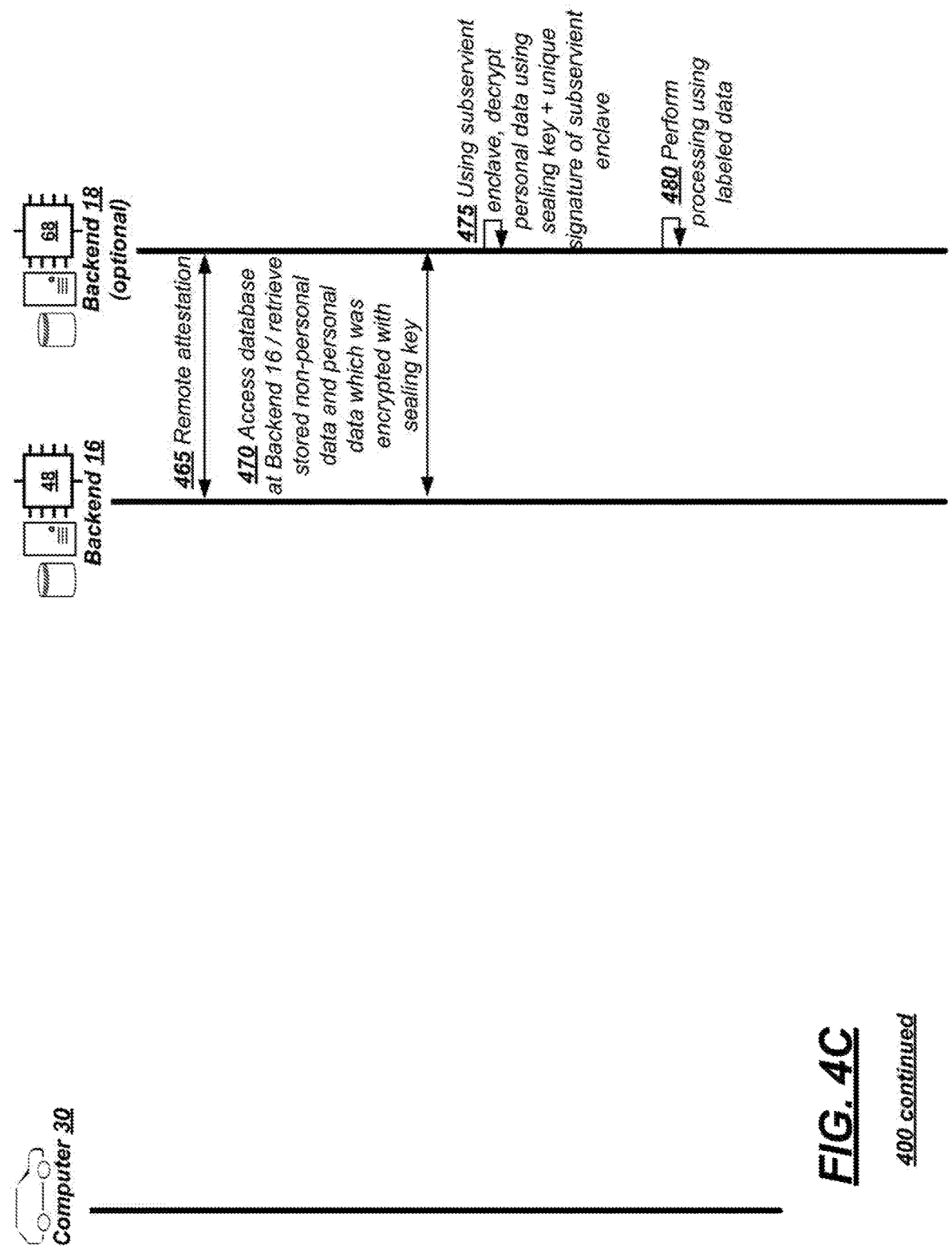

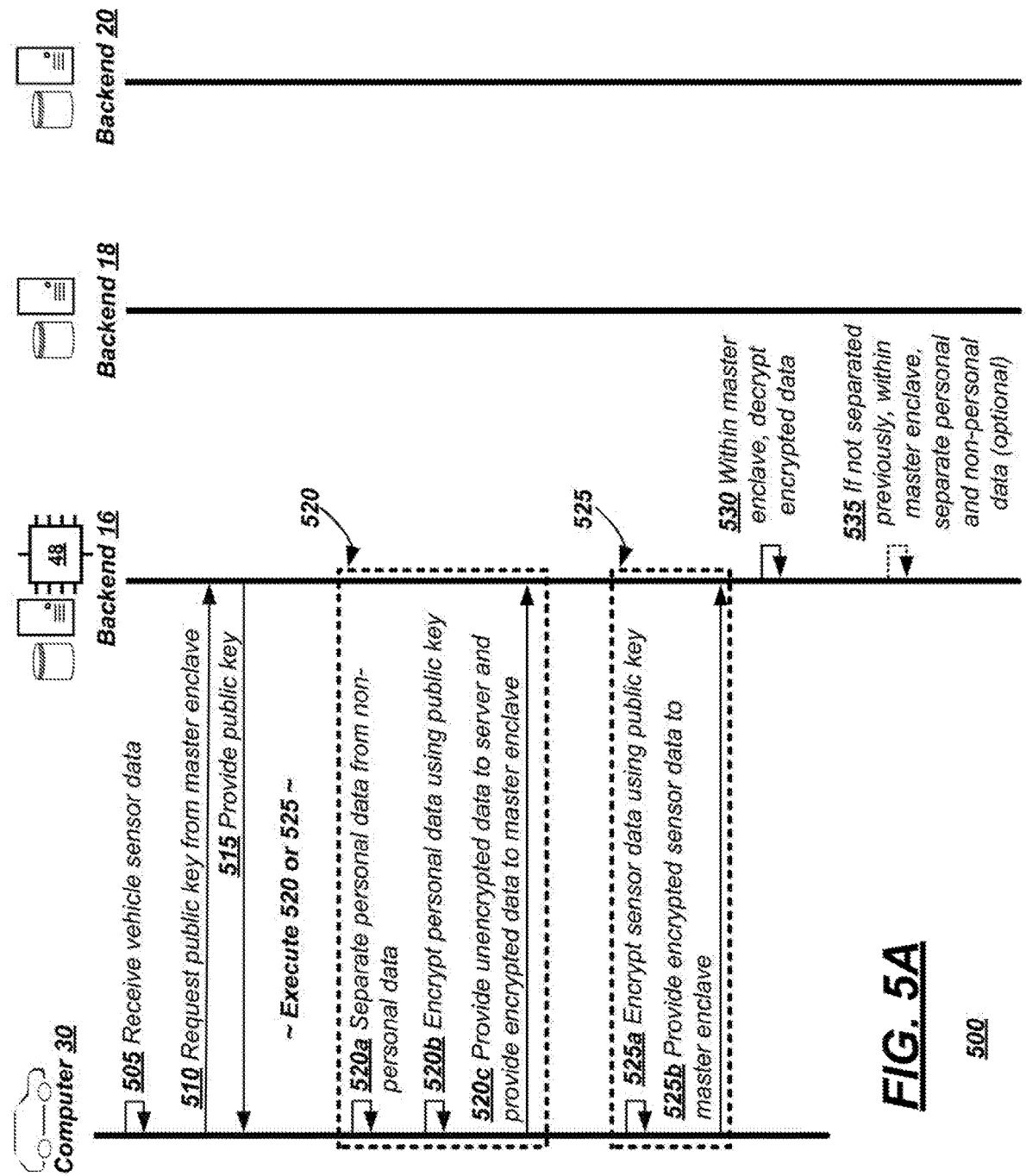

500 continued 500 continued

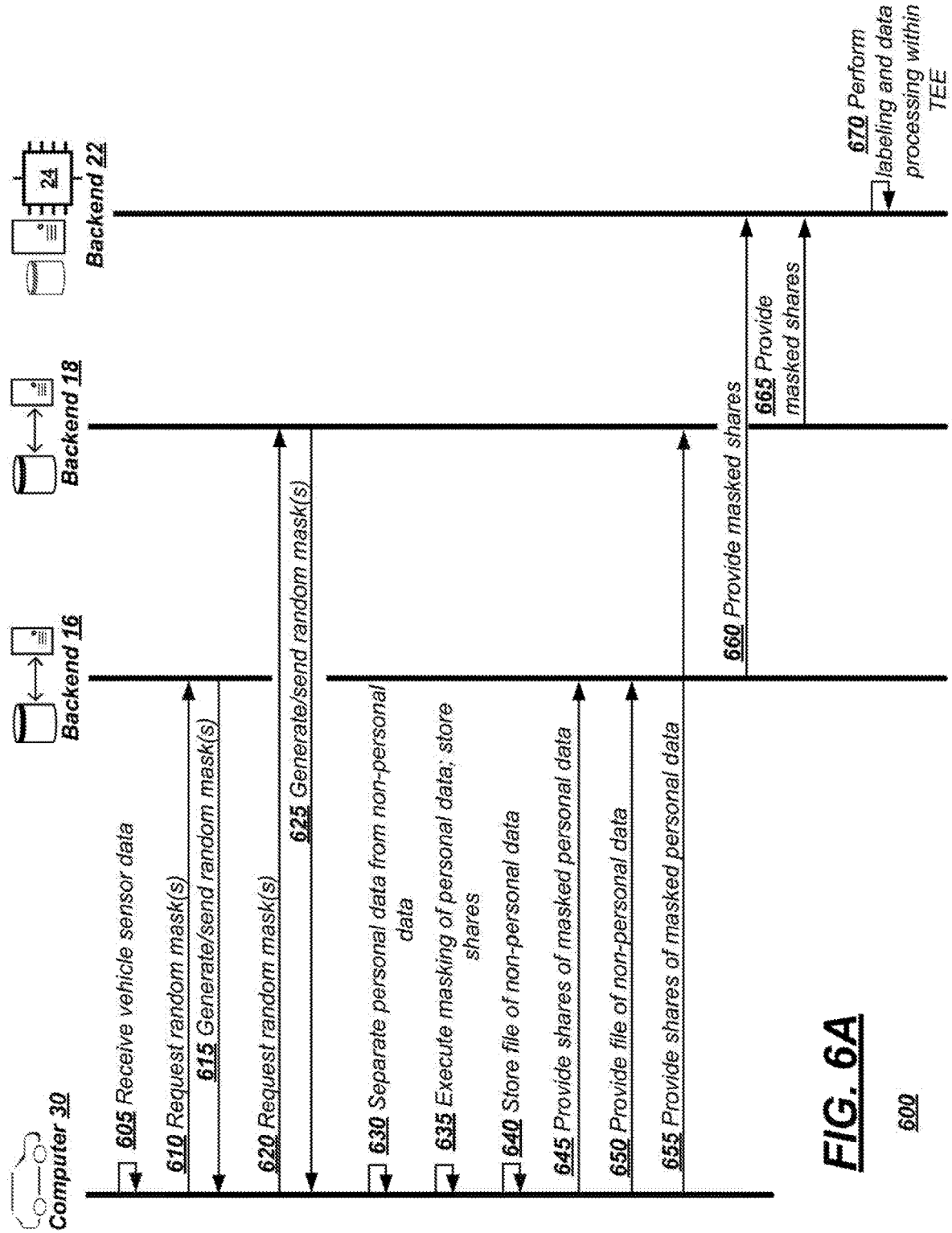

600

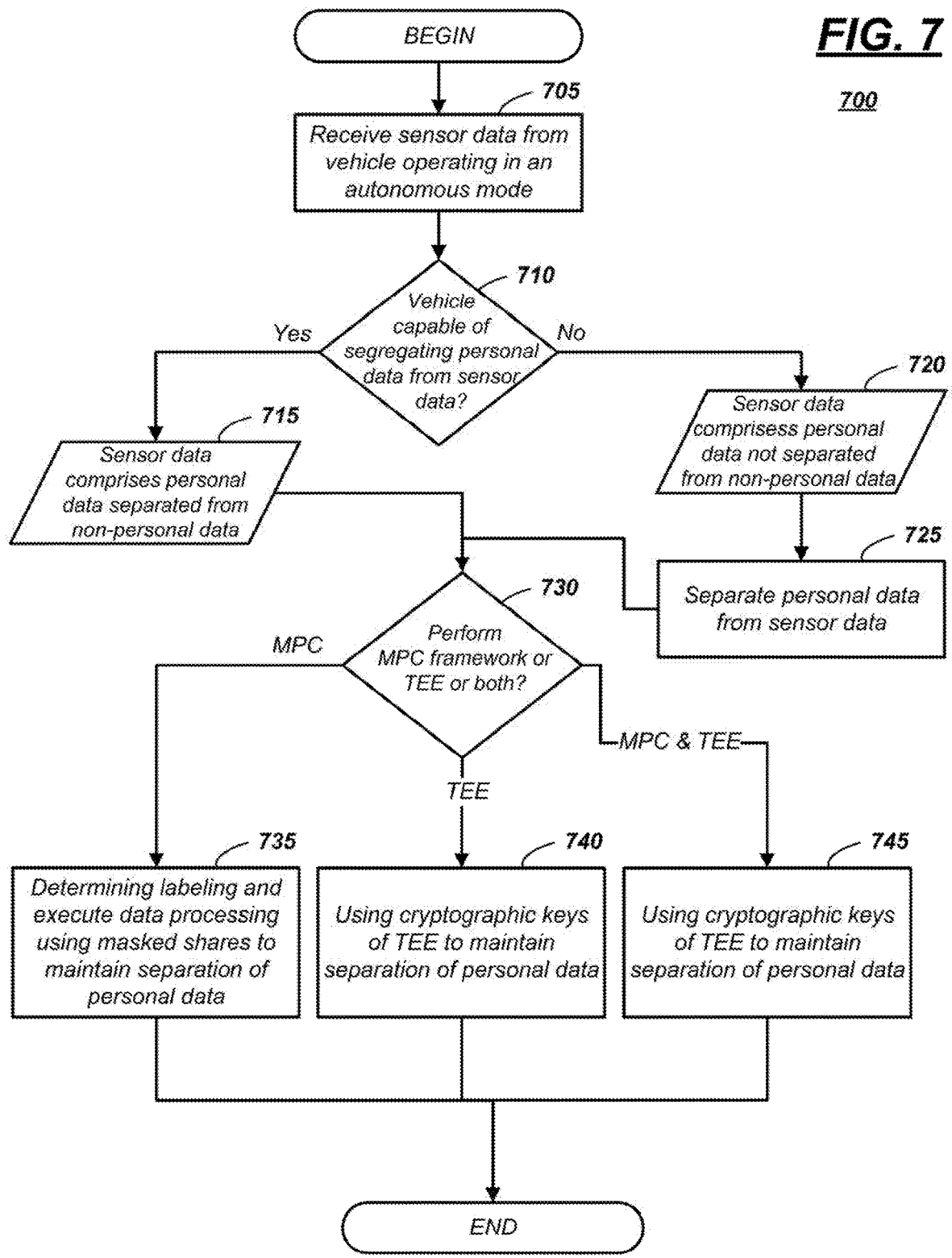

DATA PRIVACY SYSTEM

TECHNICAL FIELD

The present disclosure relates generally to data security and data privacy.

BACKGROUND

Private and/or public (e.g., government) entities may desire to use data gathered by cameras and the like for a variety of purposes. In some instances, this data may contain personally identifiable information (PII). Improper handling of this data may violate local, regional, or global privacy laws—such as General Data Protection Regulation (GDPR) or the California Consumer Privacy Act (CCPA).

SUMMARY

According to an embodiment, a method of managing personal data associated with a vehicle is disclosed. The method may comprise: receiving, at a first backend computer, sensor data associated with a vehicle; determining a labeling of the sensor data, comprising: determining personal data and determining non-personal data that is separated from the personal data, wherein each of the personal and non-personal data comprise labeled data, wherein the personal data comprises information relating to at least one identified or identifiable natural person; and performing via the personal data and the non-personal data that is separated from the personal data, at the first backend computer, data processing associated with collecting sensor data associated with the vehicle.

According to another embodiment, a first backend computer is disclosed that may comprise: one or more processors; and memory storing a plurality of instructions executable by the one or more processors, wherein the plurality of instructions comprise, to: receive, at the first backend computer, sensor data associated with a vehicle; determine a labeling of the sensor data, comprising: determining personal data and determining non-personal data that is separated from the personal data, wherein each of the personal and non-personal data comprise labeled data, wherein the personal data comprises information relating to at least one identified or identifiable natural person; and perform via the personal data and the non-personal data that is separated from the personal data, at the first backend computer, data processing associated with collecting sensor data associated with the vehicle.

According to another embodiment, a non-transitory computer-readable medium is disclosed. The medium may comprise a plurality of instructions stored thereon, wherein the plurality of instructions are executable by one or more processors of a first backend computer, wherein the plurality of instructions comprise, to: receive, at the first backend computer, sensor data associated with a vehicle; determine a labeling of the sensor data, comprising: determining personal data and determining non-personal data that is separated from the personal data, wherein each of the personal and non-personal data comprise labeled data, wherein the personal data comprises information relating to at least one identified or identifiable natural person; and perform via the personal data and the non-personal data that is separated from the personal data, at the first backend computer, data processing associated with collecting sensor data associated with the vehicle.

BRIEF DESCRIPTION OF THE DRAWINGS

FIGS. 2A, 2B, 2C are a flow diagram illustrating a process of using the data privacy system.

FIGS. 4A, 4B, 4C are a flow diagram illustrating another process of using the data privacy system.

FIGS. 5A, 5B, 5C are a flow diagram illustrating another process of using the data privacy system.

FIGS. 6A, 6B are a flow diagram illustrating another process of using the data privacy system.

FIG. 7 is a flow diagram illustrating another process of using the data privacy system.

DETAILED DESCRIPTION

Figure 1:
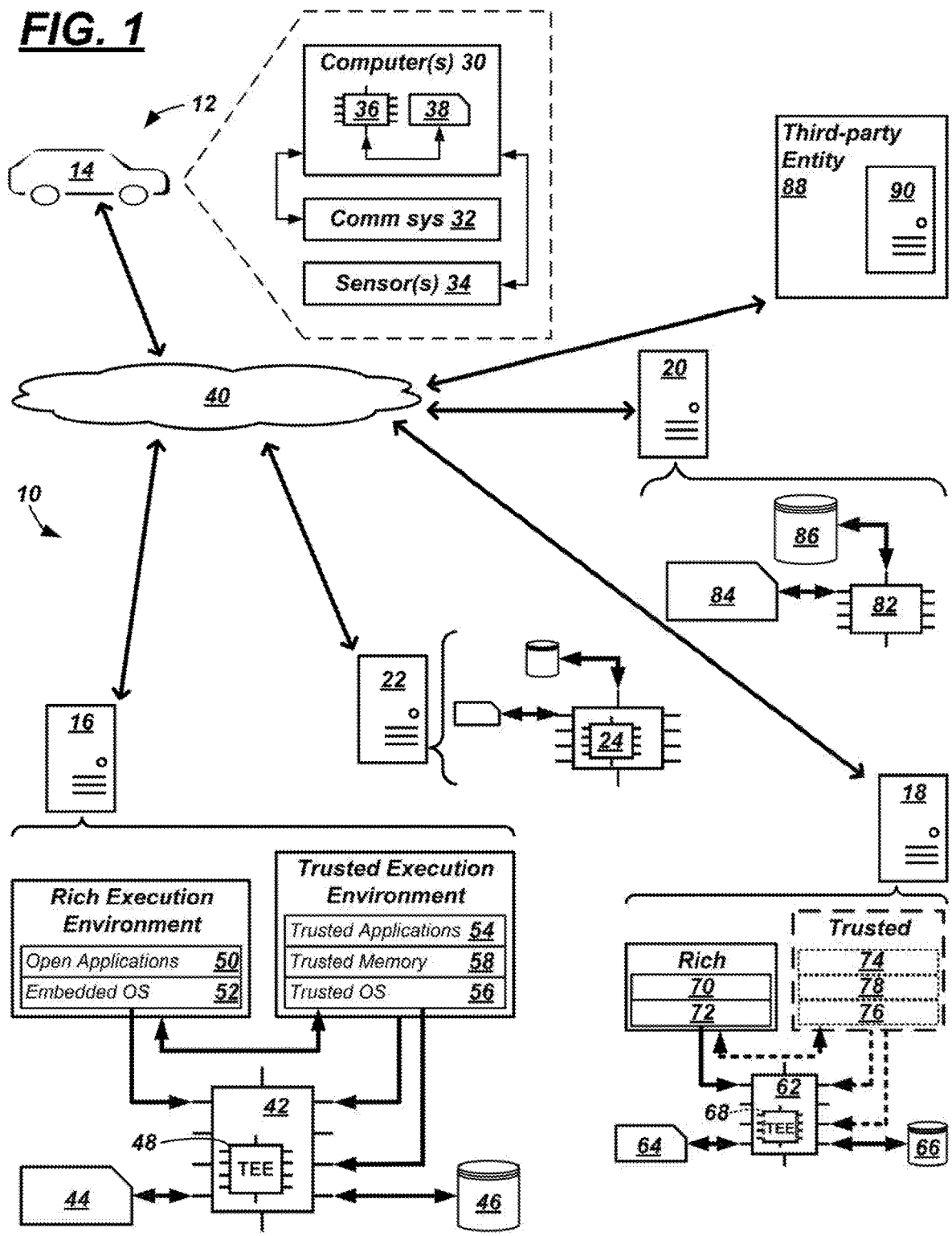
FIG. 1 is a schematic diagram illustrating an example of a data privacy system comprising a data collection system and a plurality of data protection systems.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Turning now to the figures, wherein like reference numerals indicate like or similar functions or features, a data privacy system 10 is shown that may comprise a data collection system 12 (e.g., embodied here within a vehicle 14) and one or more data protection systems 16, 18, 20 (also referred to as 'backend computers 16, 18, 20') (e.g., here, three backend computers are shown; however, more or fewer may be used instead). Modern computing systems gather multitudes of data of objects—including humans (e.g., natural persons)—during the course of their operations. This data may be used for various reasons—e.g., in some instances, the data may be used by engineers to improve vehicle computing systems at a backend facility (e.g., such as advanced driving systems which enable partially or fully autonomous driving modes—e.g., in accordance with Level1, Level2, Level3, Level4, and Level5, as defined by the Society of Automotive Engineers (SAE)). For example, simulation and training of developed software may better be implemented when real-life scenarios are used as input. Current data privacy laws however may prevent the use of some of this data—e.g., if the data comprises personal data (e.g., such as personally identifiable information (PII)). System 10 enables collection and protection of both personal and non-personal data—e.g., consistent with developing privacy laws such as the General Data Protection Regulation (GDPR) and the California Consumer Privacy Act (CCPA). More particularly, system 10 facilitates protecting personal data using, among other things, a Multi-Party Computation (MPC) framework, a Trusted Execution Environment (TEE), or both. It should be appreciated that though the disclosure below uses vehicle 14 (which may collect data while operating in at least one autonomous driving mode) to illustrate data collection system 12, other data collection systems are possible—e.g., such as other uses of cameras or other sensors mounted to infrastructure (e.g., whether or not sensors are being used in connection with autonomous driving or not).

Before describing Figure (FIG. 1, personal data, non-personal data, a Multi-Party Computation (MPC) framework, and a Trusted Execution Environment (TEE) are described, as these terms may be used in the written description and claims.

Personal data may refer to one or more of the following: any information relating to an identified or identifiable natural person; an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. Personally identifiable information (PII) is a non-limiting example of personal data. A natural person may refer to an individual human being having his or her own legal personality (whereas e.g., a legal person herein may refer to an individual human being, a private organization (e.g., a business entity or a non-governmental organization), or public organization (e.g., a government entity)). Thus, for example, personal data may refer to address information associated with a specific identified or identifiable natural person, neighborhood or locality information associated with a specific identified or identifiable natural person, an address number associated with the at least one identified or identifiable natural person, biometric information associated with a specific identified or identifiable natural person, physical features of the at least one identified or identifiable natural person, vehicle information (e.g., license plate information) associated with a specific identified or identifiable natural person, image data or video data associated with a specific identified or identifiable natural person (e.g., wherein video data comprises a sequence of images), or the like.

Non-personal data may refer to data that is not personal data. Continuing with the example of vehicle 14, sensors of vehicle 14 may receive a combination of personal and non-personal data (e.g., referred to herein as unsegregated data). For example, a camera sensor of vehicle 14 may not filter out all personal data from an image but instead the personal and non-personal elements often may be captured together—e.g., when a leading vehicle (ahead of vehicle 14) is imaged, a license plate identifier of the leading vehicle is typically captured concurrently; the leading vehicle may not be personal data, whereas the license plate identifier may be personal data.

A Multi-Party Computation (MPC) framework may refer to a masking computation of personal data or unsegregated data, wherein at least a first input (e.g., one or more random masks) from a first party (one of the data protection systems 16, 18, 20) is received, wherein at least a second input (e.g., one or more random masks) from a second (different) party (e.g., another one of the data protection systems 16, 18, 20) is received, wherein the masking computation uses the first and second inputs to determine an output (e.g., shares of masked data), wherein each of the first and second parties receive an output (e.g., the first party receives a first portion of a set of shares of masked data and the second party receives a different, second portion of the set of shares of masked data, wherein the shares of the first portion may be exclusive of the shares of the second portion). According to this framework, the first party cannot decipher the original personal data or unsegregated data without the share(s) of the second party (which it does not have), or vice-versa. Thus, any data breach (e.g., due to a malicious attack) cannot decipher the personal data of the first party (even if the data breach includes acquiring the shares of the first party). The data is similarly preotected if a data breach of the second party occurs. It should be appreciated that parties to an MPC framework themselves cannot access the data without consent among all or a quorum of the parties that this should be allowed. Accordingly, the use of the MPC framework may be compliant with GDPR or CCPA.

A Trusted Execution Environment (TEE) may refer to an isolated computing environment of a computer which is implemented in both hardware and software. The TEE may comprise an isolated (e.g., partitioned) portion of a processor having an independent operating system (OS) (e.g., called a Trusted OS) which executes software applications on an isolated (e.g., partitioned) portion of a memory—e.g., so that only predetermined software applications (e.g., typically those by the TEE developer) may be executed. The TEE memory may store a (cryptographic) private key (e.g., according to a public-private key pair such as a Rivest-Shamir-Adleman (RSA) key, an Elliptic Curve Diffie-Hellman key Exchange (ECDHE) key, etc.); in some instances, this private key may be used with a (cryptographic) public key when input data is received from outside the TEE. In this manner, the provider of input data may verify that the TEE (and only the TEE) performed a predetermined computation using the input data. E.g., in the context of the present disclosure, the TEE may receive the input data from a first party, perform a cryptographic computation (a hash function), and sign the output with the private key (e.g., yielding a hash). Thereafter, the TEE may provide the hash and a corresponding public key to the first party. The TEE similarly may transact with the second (or other) parties. Herein, cryptographic functions may utilize cryptographic keys, wherein cryptographic keys may refer to a public key, a private key, a symmetric key, etc.—e.g., according to any suitable public-private key infrastructure, symmetric key infrastructure, etc.

Turning now to FIG. 1, data collection system 12 may comprise, among other things, a computer 30, a communication system 32, and one or more sensors 34. Computer 30 may facilitate the collection of unsegregated data, some processing of the data, and the communication of that data to at least one of the data protection systems 16-22. Computer 30 may comprise one or more processors 36 and memory 38.

One or more processors 36 may be any suitable device that controls sensor(s) 34 and/or communication system 32. Processor(s) 36 may be programmed to process and/or execute digital instructions to carry out at least some of the tasks described herein. Non-limiting examples of processor(s) 36 include one or more of: a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 36 read from memory 38 and/or and execute multiple sets of instructions which may be embodied as a computer program product stored on a non-transitory computer-readable storage medium (e.g., such as memory 38). Some non-limiting examples of instructions are described in the process(es) below and illustrated in the drawings. These and other instructions may be executed in any suitable sequence unless otherwise stated. The instructions and the example processes described below are merely embodiments and are not intended to be limiting.

Memory 38 may comprise volatile and/or non-volatile memory devices. Non-volatile memory devices may comprise any non-transitory computer-usable or computer-readable medium, storage device, storage article, or the like that comprises persistent memory (e.g., not volatile). Non-limiting examples of non-volatile memory devices include: read-only memory (ROM), erasable programmable read-only memory (EPROM), electrically erasable programmable read-only memory (EEPROM), optical disks, magnetic disks (e.g., such as hard disk drives, floppy disks, magnetic tape, etc.), solid-state memory (e.g., floating-gate metal-oxide semiconductor field-effect transistors (MOSFETs), flash memory (e.g., NAND flash, solid-state drives, etc.), and even some types of random-access memory (RAM) (e.g., such as ferroelectric RAM). According to one example, non-volatile memory devices may store one or more sets of instructions which may be embodied as software, firmware, or other suitable programming instructions executable by processor(s) 36—including but not limited to the instruction examples set forth herein.

Volatile memory devices may comprise any non-transitory computer-usable or computer-readable medium, storage device, storage article, or the like that comprises nonpersistent memory (e.g., it may require power to maintain stored information). Non-limiting examples of volatile memory include: general-purpose random-access memory (RAM), static RAM (SRAM), dynamic RAM (DRAM), or the like.

Communication system 32 may comprise electronic circuitry (and/or programmed/programmable software) to facilitate wired communication, wireless communication, or both. For example, communication system 32 may comprise a wireless chipset for short-range (e.g., Wi-Fi, Bluetooth, etc.) wireless communication or long-range (e.g., cellular, satellite, etc.) wireless communication. Further, communication system 32 may comprise a wired interface having a port so that a trained technician physically may connect a service computer to the port and download protected personal and/or non-personal data from memory 38. Other aspects of communication system 32 also are contemplated herein.

One or more sensors 34 may comprise any suitable electronic hardware which may gather sensor data of its surroundings. Non-limiting examples of sensor(s) 34 comprise a light detection and ranging (lidar) sensor, a digital camera sensor (e.g., detecting light in and around the visible spectrum), an infrared camera, a short-, medium-, or long-range thermal imaging sensor, a milli-meter radar sensor, a sonar sensor (e.g., an ultrasonic sensor), etc. As shown, sensor(s) 34 may communicate unsegregated data to computer 30, which in turn may provide this unsegregated data to communication system 32. As further described below, computer 30 may alter the unsegregated data before providing it to communication system 32—e.g., computer 30 may mask the data, may separate the personal data from the non-personal data, may encrypt the data, may execute a combination of these tasks, etc.

Sensor data may refer to any suitable image data, a plurality of data points of a lidar sensor, a plurality of data points of a millimeter radar sensor, a plurality of data points of a sonar sensor, or the like. Image data may refer to digital images of a digital camera sensor, elements of digital images (e.g., pixels or groups of pixels), a frame of video, or the like. Non-personal data may be embodied in sensor data, and personal data may be embodied in image data and some other forms of sensor data.

Data collection system 12 may communicate with one or more of backend computers 16-20 via a wired and/or wireless system 40. Similarly, any of backend computers 16-22 may communicate with one another via system 40. System 40 may comprise public telephony infrastructure, cable communication infrastructure, cellular tower and base station infrastructure, satellite and satellite base station infrastructure, and/or the like—all of which is known in the art. Thus, wired and/or wireless system 40 should be construed broadly. In at least the present implementation, system 40 may comprise any suitable hardware and/or software implementing vehicle-to-vehicle (V2V) communication, vehicle-to-infrastructure (V2I) communication, and/or vehicle-to-everything (V2X) communication.

One example of backend computer 16 is shown in FIG. 1. It should be appreciated that some illustrated aspects of backend computer 16 are optional and not used in all embodiments. Further, at least some of the hardware and software aspects of backend computer 16 are similar to aspects of backend computer 18 and/or backend computer 20—however, the data that each of backend computer 16, 18, and/or 20 store and/or process may differ.

According to an example, backend computer 16 may comprise one or more processors 42 (only one is shown) and memory 44, 46. According to one example, the hardware of processor(s) 42 may be similar to processor 36, described above; therefore, this hardware will not be re-described here in detail for sake of brevity. At least some of the instructions executed by processor(s) 42 may differ from those executed by processor(s) 36—as will be illustrated in the flow diagrams which follow.

According to at least one non-limiting example, processor(s) 42 may comprise a trusted execution environment (TEE) 48, and TEE 48 may be optional. FIG. 1 illustrates an example of how TEE 48 and processor 42 may interact. For example, processor 42 generally may be embodied as a rich execution environment having open software applications 50 stored in memory 44 and an embedded operating system (OS) 52 stored in memory 44 and executable by processor 42, whereas TEE 48 may comprise trusted software applications 54, a trusted operating system (OS) 56, and trusted memory 58 (e.g., the memory may be partitioned in both hardware and software). Trusted software applications 54 may be stored in trusted memory 58 and may be executed exclusively by trusted OS 56. Trusted software applications 54 may comprise a data privacy system that uses a private-public key pair, wherein memory 58 securely stores one or more (cryptographic) private keys and their corresponding public keys. As described more below, TEE 48—via processor 42—may provide vehicle 14 with a public key to encrypt its sensor data; then, upon receipt of the sensor data (or a portion thereof) at backend computer 16, TEE 48—using the corresponding private key—may decrypt the sensor data within the TEE 48. Another such private key stored within and used by the TEE 48 may be referred to as a sealing key, wherein the sealing key may be used by TEE 48 to encrypt personal data (e.g., a portion of the sensor data), and the personal data then may be stored in memory 46 or elsewhere. In either case, neither private key is shared with the embedded OS 52, other parts of processor 42, or other devices.

According to one example, the hardware of memory 44 and memory 46 may be similar to memory 38, described above; therefore, these will not be re-described in detail here for sake of brevity. According to one example, memory 44 may store at least some of the instructions executable by processor 42 (e.g. embodied as open software applications 50 and embedded OS 52), and memory 46 may be embodied as a database of nonvolatile memory. Thus, continuing with one of the examples described above, personal data encrypted using the sealing key could be stored in memory 46. Further, memory 58 may comprise volatile and/or non-volatile memory accessible only by TEE 48 (e.g., partitioned memory).

According to one embodiment (described more below), the TEE 48 operates as a master enclave. A master enclave may refer to a TEE which has subservient enclaves (e.g., also embodied as TEEs). In this manner, the data handled by one TEE may be at least partially accessible by another TEE. For example, as explained below, when a master enclave signs data using a sealing key, subservient enclave(s) may decrypt the data provide they use both the sealing key and a unique signature that identifies them as an enclave subservient to the master enclave.

An architecture of backend computer 18, in at least one example, may be arranged similarly to backend 16, except the TEE of backend computer 18 may be a subservient TEE. For instance, as shown in FIG. 1, backend computer 18 may comprise one or more processors 62 and memory 64, 66. And processor(s) 62 may comprise a trusted execution environment (TEE) 68. TEE 68 also may be optional. TEE 68 and processor 62 may interact as similarly described above. For example, processor 62 generally may be embodied as a rich execution environment having open software applications 70 and an embedded operating system (OS) 72, whereas TEE 68 may comprise trusted software applications 74, a trusted operating system (OS) 76, and trusted memory 78 (e.g., memory which may be partitioned in both hardware and software). As will be described in at least one of the flow diagrams, a subservient TEE (e.g., TEE 68) may access data stored in memory 46 (e.g., a database) using the same sealing key used by TEE 48 plus its own unique signature.

Backend computer 20 may comprise one or more processors 82 and memory 84, 86 and may or may not comprise a TEE (subservient or otherwise). Again, for sake of brevity, the hardware of processor(s) 82 and memory 84, 86 may be similar to processor(s) 42 and memory 44, 46—e.g., again, processor(s) 82 may execute instructions at least partially different from processor(s) 42 and 62 and store data that is at least partially different from data stored in memory 44, 46, 64, 66.

According to an example, the hardware of backend computer 22 may be similar or identical to backend computer 16 or 18—e.g., it may comprise a TEE 24 which may comprise a subservient enclave (e.g., operating similar to optional TEE 68). According to an example, this subservient enclave is subservient to master enclave associated with TEE 48.

It should be appreciated that in the process examples described below that backend computers 16, 18, 20, 22 each can represent different parties which do not collude with one another. E.g., they are unrelated entities—e.g., they may be owned by different organizations which do not share or exchange confidential or other data information with one another according to any contractual or organizational relationship or obligation. An absence of collusion of the content of the sensor data promotes compliance of data privacy regulations.

FIG. 1 also illustrates a third party entity 88 which may (or may not) comprise a third party server 90. In some instances, third party entity 88 comprises an organization that securely analyzes personal data—e.g., and may be compliant with local, regional, and/or global data privacy laws. According to one non-limiting example, third party entity 88 may receive shares of masked data (and the corresponding masks used to mask the data)—e.g., according to an MPC framework—and unmask the masked (personal) data using the shares of at least two different parties. In this manner, experienced humans may analyze and label personal data therein. Labeling of data may refer to any suitable classification technique which categorizes objects for computer analysis. For example, in the context of autonomous driving modes, determining a labeling may include associating an identifier with vehicles, lane markers, pedestrians, etc., as well as labeling personal data and the portion of sensor data associated with the personal data. To illustrate the latter example, consider image data of a surroundings of vehicle 14. The image data may comprise a license plate number of another vehicle which is on a roadway; the vehicle, the roadway, and the license plate number each may be associated with a label; further, the pixel data associated with each of the vehicle, the roadway, and the license plate number also may be identified. Continuing with the example above, once labeled at third party entity 88, the fact that the vehicle had a license plate may be stored (i.e., based on its label); however, the characters which identify the license plate and/or its owner may be hidden (e.g., to promote compliance with privacy laws). Third party entity 88 may re-mask this labeled (personal) data and re-share it (i.e., send it back to computers such as backend computer 16 or 18, as described more below)—thereby promoting compliance with privacy laws. Sensor data comprising masked (e.g., hidden) personal data may be useful to engineering software models using real-world scenarios to simulate and train autonomous driving computers. Further, by securely hiding the personal data, engineering may be compliant with local, regional, and/or global data privacy laws.

In instances that third-party entity 88 comprises server 90, server 90 may comprise one or more processors and memory such as those described above (not shown). And server 90 may be configured to execute software applications that extract or identify—at least in part—personal data and perform labeling functions of the personal data.

Figure 2B:
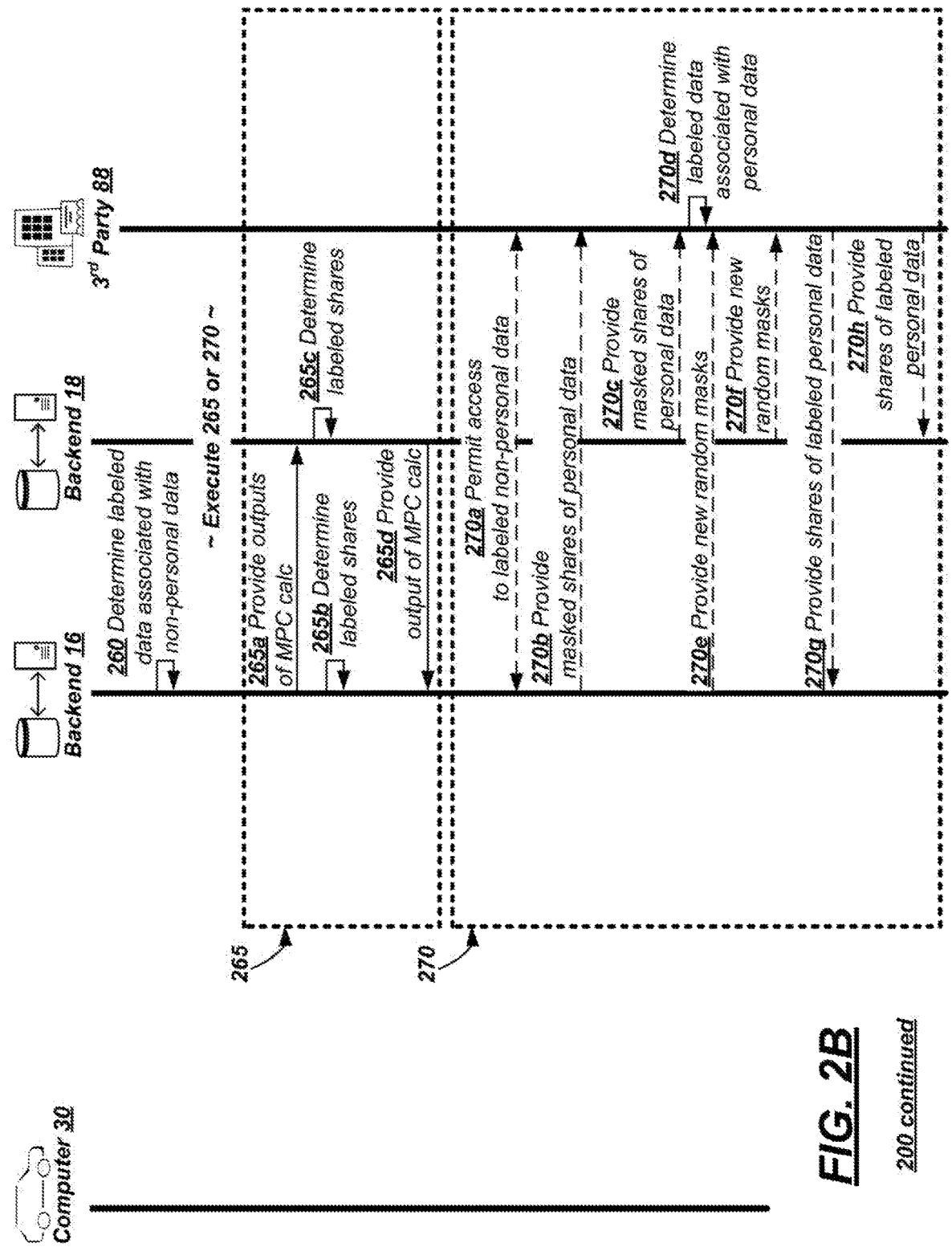
Figure 2C:
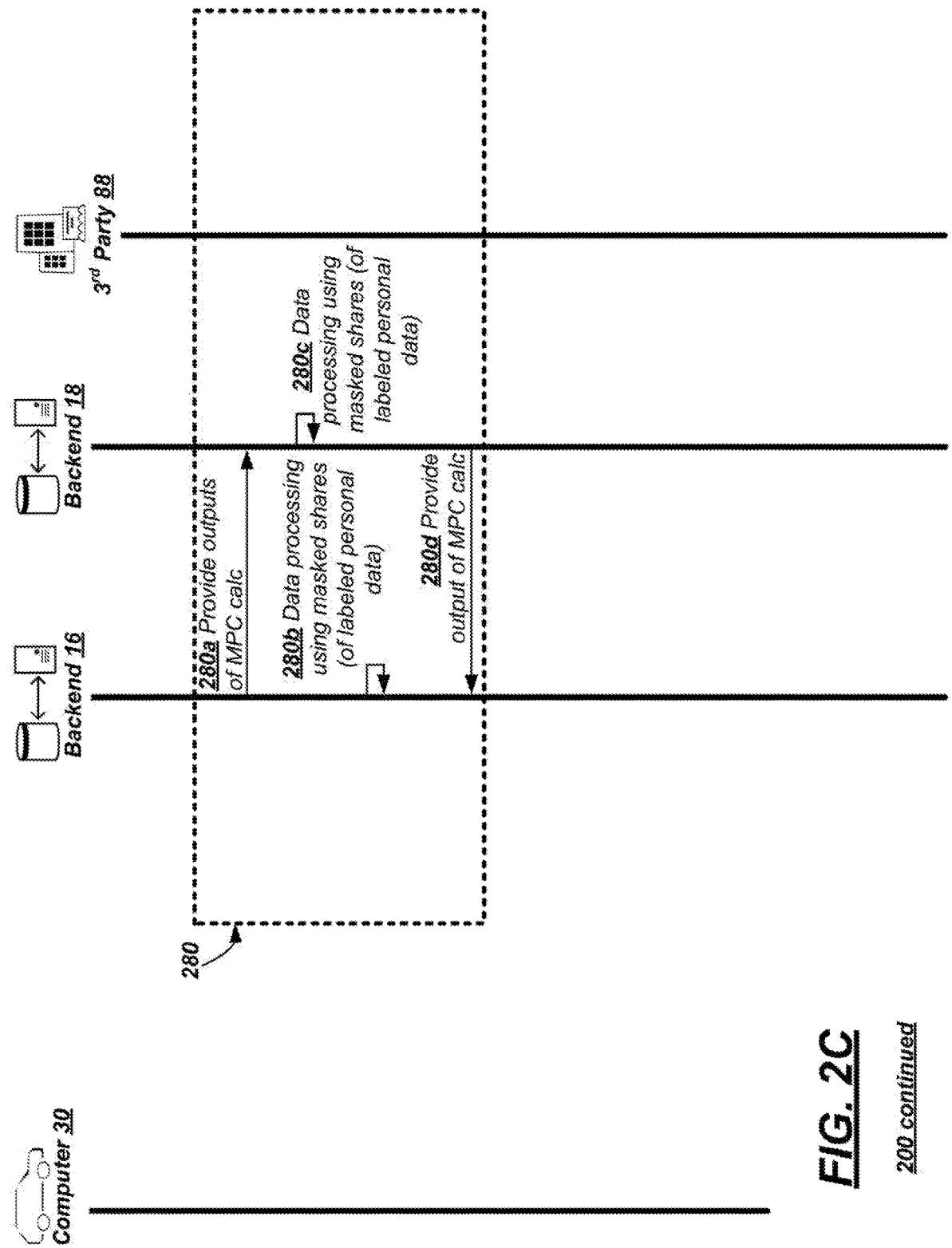

Turning now to FIGS. 2A, 2B, 2C, a process 200 is shown illustrating collecting sensor data and protecting the personal data therein using an MPC framework, wherein computer 30 of vehicle 14 separates the personal data from the non-personal data. Separating data may refer to isolating a portion of the sensor data from another portion of it in an effort to minimize risk of a data privacy breach. This separation may occur in a hardware context (e.g., in a trusted execution environment (TEE) and/or signed using a cryptographic key of the TEE). In another contexts, separation may occur in a software context, wherein a breach of data held by one entity (e.g., backend computer 16) is useless without the breach of data from a second facility (e.g., such as backend computer 18). Of course, separation may occur in both hardware and software contexts as well.

In block 205 of the flow diagram, computer 30 (e.g., processor 36) of vehicle 14 may receive vehicle sensor data. As discussed above, according to at least one example, vehicle 14 may be capable of operating in one or more autonomous driving modes. While so doing, sensor(s) 34 may collect sensor data—e.g., lidar sensor data, camera sensor data, ultrasonic sensor data, radar sensor data, etc.

In block 210 which may follow, computer 30 may request one or more random masks from backend computer 16. And in response (in block 215), backend computer 16 may generate and/or send the random masks. A mask may refer to any suitable data that is used to hide at least a portion of the sensor data. In this manner, should the sensor data (e.g., personal data within the sensor data) be acquired by a malicious attacker or unauthorized party, the personal data will be hidden and unviewable/attainable provided the attacker/party does not have the ability to remove the mask. According to one non-limiting example, a mask may be random noise, and the mask may be combined with sensor data such that the data is secure (e.g., not recognizable) without removal of the mask or without an MPC algorithm which can process the data despite it being masked. According to an example, the computer 30 may request multiple masks when securing image data; e.g., a different random mask may be applied to each pixel of personal data in the image data (or e.g., a different random mask may be applied to a relatively small collection of pixels of personal data in the image data). This is merely an example, and other embodiments are contemplated herein.

In block 220, computer 30 may request one or more random masks from backend computer 18 as well. And in response in block 225, backend computer 18 may generate and/or send one or more random masks to computer 30 (e.g., similar to that in block 215).

In block 230, computer 30 may separate (e.g., segregate) the sensor data into two categories: personal data and non-personal data. For example, the computer 20 may execute a set of computer instructions which parses the sensor data for personal data (as described above) and identifies the personal data. For example, in the context of the sensor data being an image, computer 30 may identify specific pixels of the image that comprise personal data (e.g., a face of a natural person, an address number of a natural person, a license plate of a natural person, etc.). One non-limiting example of an algorithm that computer 30 may execute to separate personal data from non-personal data is can be designed using Haar Cascades for face detection. Other examples also may exist.

In block 235—having identified the personal data within a set of sensor data, computer 30 may execute a masking of this personal data. Masking may comprise determining so-called shares of masked data by applying one or more masks to the personal data. In at least one example, these shares may be stored (at least temporarily) in memory 38 of computer 30.

Executing the masking may comprise using the mask(s) provided by backend computer 16 and the mask(s) provided by backend computer 18. Continuing with the example set forth above, both masks may be utilized to mask the sensor data associated with personal data. For instance, according to a non-limiting example, random noise (a random mask from computer 16) and random noise (a different random mask from computer 18) may be applied to a common pixel containing or associated with personal data (and this may be repeated using masks from computers 16, 18 for other pixels as well). In this manner, the personal data can only be deciphered by an unintended recipient of the masked data if the unintended recipient possesses both masks—an unlikely scenario. Such masking techniques may be suitably compliant with global and regional data privacy regulations (e.g., such as GDPR and CCPA, discussed above). In this example, two backend computers 16, 18 provide random masks to vehicle 14; however, it should be appreciated in other examples, three or more backend computers could provide random masks (e.g., such that three or more corresponding masks are applied to the personal data).

In block 240, computer 30 may store at least one file comprising the non-personal data of the set of sensor data in memory 38 as well. According to at least one example, the non-personal data is stored as a single file, whereas the stored shares of masked data are multiple files.

In block 245, a first portion of the shares of masked personal data may be provided to backend computer 16. This may occur in any suitable manner. For example, in some instances, computer 30 may wirelessly communicate the masked shares to backend computer 16 via communication system 32—e.g., via a secure technique (e.g., according to a Transport Layer Security (TLS) protocol or the like). According to another example, vehicle 14 may be serviced by an authorized service technician who manually downloads the first portion of masked shares (e.g., at an authorized facility)—e.g., using a physical port of communication system 32. Other techniques may be used as well.

Similarly, in block 250, the file(s) of non-personal data are provided to backend computer 16. This may occur in any suitable manner (e.g., and may be similar to block 245).

In block 255, a second portion of the shares of masked personal data are provided securely to backend computer 18. According to an example, the shares of the first portion may be exclusive of the shares of the second portion. This also may occur in any suitable manner (e.g., similar to block 245).

Turning now to FIG. 2B, process 200 continues. In block 260, backend computer 16 may determine labeled data associated with the non-personal data. As will be appreciated skilled artisans, labeling may refer to using a classification algorithm to identify objects within the computer data, wherein—once identified—the object is tagged with the label (e.g., metadata). Such labels are used by automotive and other engineers to utilize the sensor data collected by vehicle 14. For example, when the sensor data comprises labels such as 'vehicle,' 'pedestrian,' 'lane marker,' etc., this may be used during computer simulations of driving in an autonomous mode, training an autonomous driving module, etc. One non-limiting example of a labeling algorithm is the YOLO (You Only Look Once) convolution neural network for object classification algorithm; however, other algorithms may be used instead or in combination therewith.

In block 265 (which may comprise blocks 265a-265d), backend computers 16, 18 may determine a labeling for the first and second portions of shares of masked personal data, in accordance with the MPC framework—e.g., utilizing an MPC algorithm that separates shares of personal data between two or more computing system which do not collude. For example, in block 265a, backend computer 16 may compute local MPC calculations and provide an output of those calculation(s) to backend computer 18; similarly, in block 265d, backend computer 18 may compute local MPC computations and provide an output of those calculation(s) to backend computer 16. In each of blocks 265b, 265c, backend computers 16, 18, respectively, may perform local operation segments of the MPC computations to facilitate labeling using a classification algorithm—e.g., using the provided information of blocks 265a, 265d. According to an example embodiment, the local computations of blocks 265a, 265d may comprise addition computations (e.g., scalar additions of random numbers (e.g., of the masks)), and the local operation segments of the MPC computations of blocks 265*b*, 265*c* may comprise multiplication computations (e.g., scalar multiplications). A non-limiting implementation of blocks 265 is referred to as Beaver Triples; however, other techniques may be employed instead. Further, it should be appreciated that the computations and operation segments described in blocks 265*a*-265*d*—used to label personal data—may be used for other data processing procedures (e.g., conducting simulations, training models, etc.) according to the MPC framework or in accordance with an MPC-TEE (hybrid) environment, as described below. The use of the MPC framework to secure personal data may be compliant with GDPR, CCPA, and other government regulations as sensor data comprising personal data is separated into two different locations.

According to one example, labeling of the personal data occurs at third party entity 88—e.g., instead of backend computer 16. For example, block 270 illustrates an illustrative embodiment which may be used instead of blocks 265*a*-265*d*.

Block 270 may comprise 270*a*-270*h*. In block 270*a*, backend computer 16 may permit third party entity 88 to access of labeled non-personal data (or block 270*a* may comprise providing the non-personal data to third party entity 88 to execute the labeling of the non-personal data). Regardless, in block 270*b*, backend computer 16 may provide its first portion of shares of masked shares of personal data, to third party entity 88. Similarly in block 270*c*, backend computer 18 may provide its second portion of shares of masked shares of personal data, to third party entity 88.

Once third-party entity 88 receives the first and second portions of masked shares from backend computers 16, 18, in block 270*d*, third party entity 88 may determine the personal data and determine label data associated with personal data. According to the MPC framework, when the masked shares of both computer 16 (in block 270*b*) and computer 18 (in block 270*c*) are used, the personal data is exposed. Thus, third-party entity 88 may be a trusted, secure environment—e.g., an organization which practices are compliant with global and regional data privacy regulations. Typically, in block 270*d*, employees of such an organization may analyze and label the personal data manually; however, such third-party entities alternatively could execute one or more labeling algorithms (e.g., using server 90).

Once the third-party entity 88 has labeled the personal data, then in block 270*e* and block 270*f*, third-party entity 88 may receive new random masks from each of backend computer 16,18, respectively (e.g., entity 88 may request these new random masks and computers 16, 18 may provide via system 40). Thereafter, third-party entity 88 may executing a masking of the personal data (now labeled) and return re-masked first and second portions of masked sharesof personal data back to each of backend computers 16, 18, respectively (e.g., re-masked first portion back to backend computer 16 and re-masked second portion back to backend computer 18).

Turning now to FIG. 2C, in block 280 (comprising blocks 280*a*-280*d*), backend computer 16 may perform data processing using the labeled personal and labeled non-personal data which are separated from one another—e.g., this may include vehicle simulations, vehicle model training, vehicle model testing, etc. Further, other embodiments may focus less on autonomous driving modes and instead on other features captured by the sensor data of vehicle 14. And still further, as discussed above, should the personal data be compromised at backend computer 16 (e.g., should there be a data breach of memory 44 or memory 46), any personal data acquired may be secure, as it is masked and undecipherable to the unauthorized recipient.

Blocks, 280*a*, 280*b*, 280*c*, 280*d* may correspond respectively to blocks 265*a*, 265*b*, 265*c*, 265*d*, respectively, as a technique of facilitating processing of data securely stored at computer 16 with data securely stored separately at computer 18. In block 265 (blocks 265*a*-265*d*), processing was directed to labeling the personal data; here, in block 280 (blocks 280*a*-280*d*), processing may be directed to data processing such as executing the computer simulations, model training, model testing, etc. (listed above by way of example only). Following block 280, process 200 may end.

Figure 3:
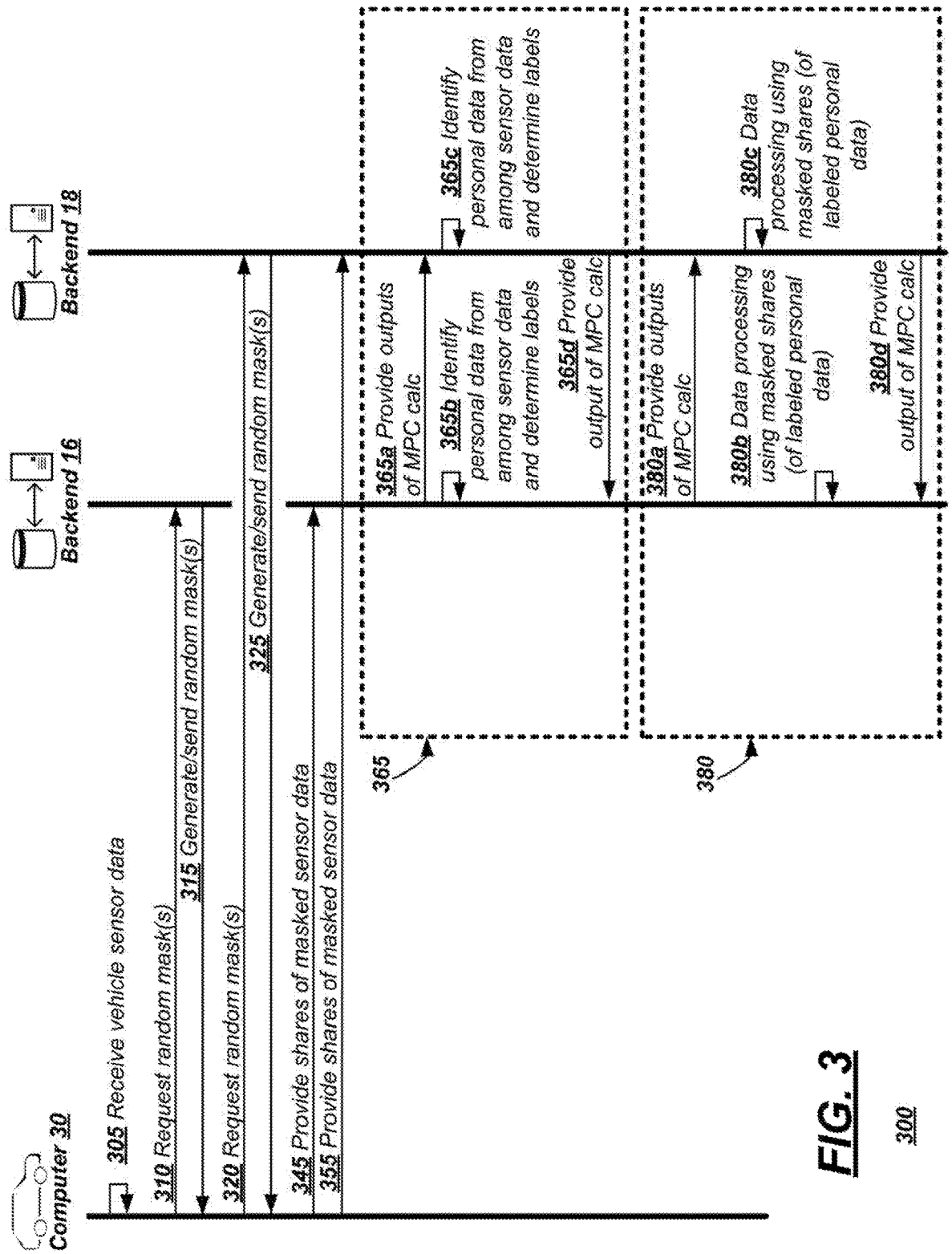
FIG. 3 is a flow diagram illustrating another process of using the data privacy system.

Turning now to FIG. 3, a process 300 is shown illustrating collecting sensor data and protecting the personal data therein using an MPC framework, wherein backend computer 16 (or alternatively, third-party entity 88) separates the personal data from the non-personal data.

Process 300 may begin with block 305. In block 305, computer 30 may receive vehicle sensor data. This may be similar to block 205 described above; therefore, this will not be re-described in detail here.

Blocks 310, 315, 320, and 325 may correspond respectively to blocks 210, 215, 220, and 225 (of process 200); therefore, these are not described in detail here. Briefly, in blocks 310-325, computer 30 of vehicle 14 may request and receives random mask(s) generated by backend computers 16, 18.

Blocks 345, 355 may correspond respectively to blocks 245, 255—e.g., except the shares of masked data are not personal data only. E.g., according to process 300, computer 30 may determine and provide the masked shares of sensor data from vehicle 14 to backend computer 16, 18, respectively; however, here, computer 30 of vehicle 14 may not separate the personal data from the non-personal data but may execute the masking. E.g., the masked shares of sensor data may comprise unsegregated personal and non-personal data. More specifically, the masked shares of sensor data may comprise a first portion of masked shares (e.g., sent to backend computer 16) and a second portion of masked shares (e.g., sent to backend computer 18). Providing the masked shares in blocks 345, 355 may be according to any suitable technique; e.g., using communication system 32 and system 40 and/or a physical connection (via a port of communication system 32), as described above. According to an embodiment of process 300, computer 30 may not be equipped to parse and/or identify personal data from amongst the sensor data and to separate personal data from non-personal data.

In block 365, backend computer 16 may separate personal data from non-personal data and label the personal and non-personal data using the MPC framework. According to at least one example, backend computers 16, 18 separate the personal data from the non-personal data using blocks 365*a*, 365*b*, 365*c*, 365*d* which correspond to blocks 265*a*, 265*b*, 265*c*, 265*d* using the shares of masked sensor data provided to them, respectively, in block 345, 355. According to at least one example, backend computers 16, 18 also label the data during blocks 365*a*-365*d*. According to another example, backend computers 16, 18 execute blocks 365*a*-365*d* first to separate the personal and non-personal data, and then re-execute blocks 365*a*-356*d* to label the personal (and/or non-personal data). In at least one example, determining a labeling may occur by executing instructions similar to those of block 270 (FIG. 2B)—e.g., still using the MPC framework to maintain separation of the personal data.

In block 380 which may follow, backend computers 16, 18 may carry out data processing instructions (e.g., computer simulations, model training, model testing, etc.). According to at least one example, block 380 may comprise block 380a, 380b, 380c, 380d which may correspond to blocks 280a, 280b, 280c, 280d. As blocks 280a-280d were previously described, these will not be re-described here.

Figure 4A:
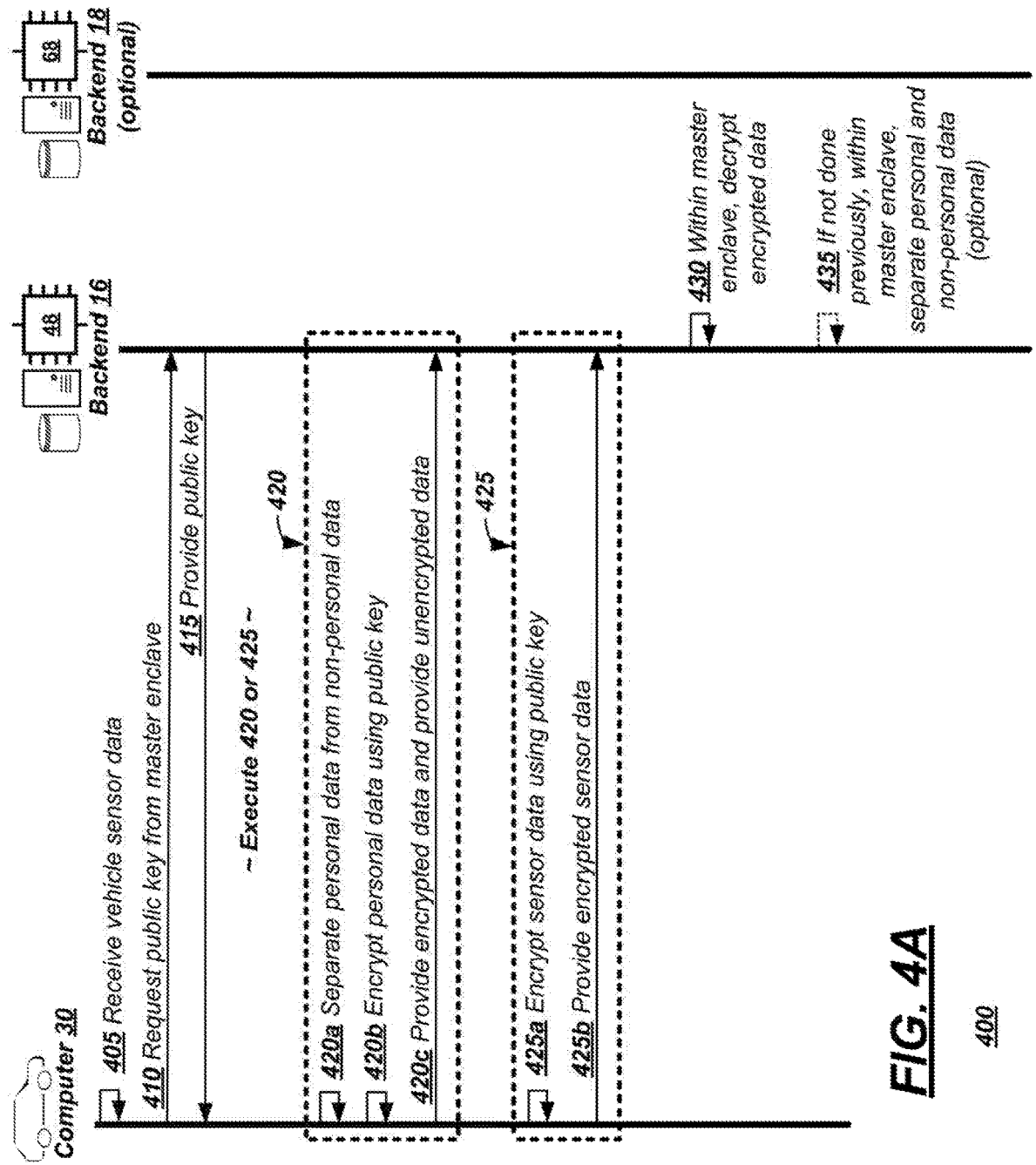
Figure 4B:
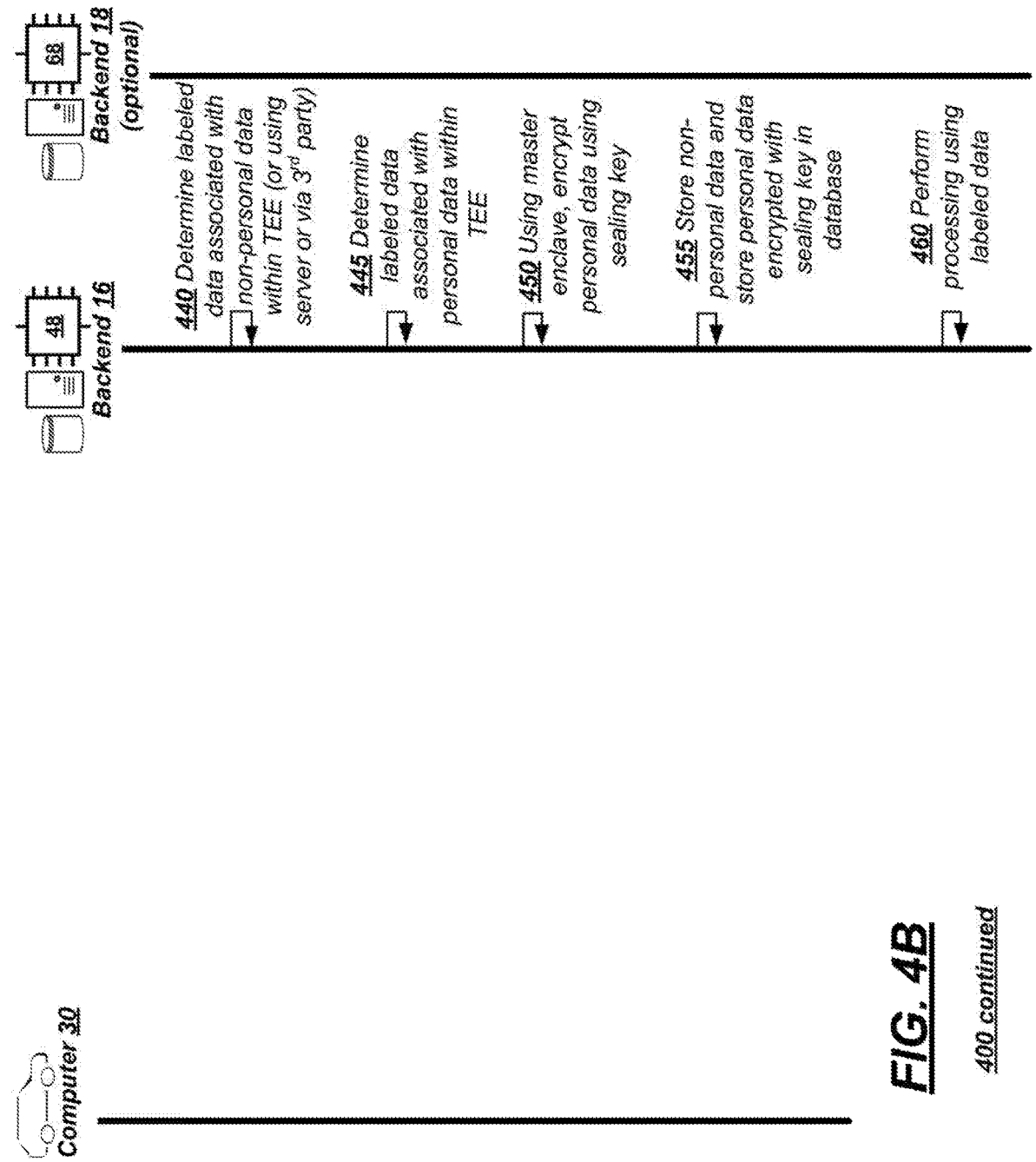

Turning now to FIGS. 4A, 4B, 4C, a process 400 is shown illustrating collecting sensor data and protecting the personal data therein using a trusted execution environment (TEE), wherein computer 30 of vehicle 14 (or backend computer 16 or third-party entity 88) separates the personal data from the non-personal data.

Process 400 may begin similarly as processes 200, 300. For example, in block 405, computer 30 of vehicle 14 may receive vehicle sensor data. As this was described above, this block not be re-described here.

According to an embodiment using TEE 48, in block 410, computer 30 of vehicle 14 may request a public key from TEE 48. While not required, according to at least one embodiment, TEE 48 may function as a master enclave—having subservient enclaves, as described more below. The request may pass from computer 30 through system 40 to backend computer 16, wherein processor 42 may provide the request to TEE 48.

In block 415, TEE 48 may provide a public key which corresponds to a secretly stored private key of the TEE 48. This may be transmitted from TEE 48 to processor 42 and to computer 30 via system 40 and communication system 32 in vehicle 14.

Following block 415, process 400 may proceed by executing block 420 or block 425. Each will be discussed in turn.

Block 420 may comprise blocks 420a, 420b, 420c. According to an embodiment of block 420a, computer 30 may separate personal data from non-personal data—e.g., as was described in block 230 above. In block 420b, computer 30 may encrypt the personal data using the public key provided by TEE 48. And in block 420c, computer 30 may provide the encrypted data (the personal data) to TEE 48. Further, in block 420c, computer 30 may provide unencrypted data to backend computer 16. Providing either encrypted or unencrypted data may be according to any suitable technique (wireless transmission, direct/manual download, etc., as was described above in block 245).

In block 425, processor 36 of computer 30 may encrypt a set of sensor data using public key provided by TEE 48 in block 415. After which, computer 30 may provide the set of encrypted sensor data to TEE 48 (as described above with respect to block 245). Thus, block 420 may be utilized when computer 30 is equipped and/or capable of separating personal from non-personal data, whereas block 425 may be executed when computer 30 is not so-equipped or capable.

In block 430 which may follow block 420 or 425, TEE 48 (within the master enclave) may decrypt the encrypted data—e.g., regardless of whether it comprises personal data or a set of sensor data (i.e., both personal and non-personal data).

In block 435, if not previously done (in block 420), TEE 48 may separate personal data from non-personal data. As this may have occurred previously, block 435 is optional.

Turning now to FIG. 4B, process 400 may continue with block 440. In block 440, labeled data associated with the non-personal data may be determined. This may occur within TEE 48. Or server 90 of third-party entity 88 may determine the labeled data. Or natural persons of third party entity 88 may examine and determine. Use of third-party entity 88 was described above and need not be re-described here.

In block 445—within TEE 48, TEE 48 may determine labeled data associated with the personal data. Evaluating personal data within TEE 48 may comport with global and regional compliance laws regarding data privacy, as trusted OS 56 and trusted applications 54 may perform the labeling. For example, when TEE 48 separates the personal data from the non-personal data, a labeling algorithm (e.g., such as YOLO (You Only Look Once) convolution neural network for object classification) may be stored as a trusted application in TEE 48.

In block 450, the master enclave of TEE 48 may encrypt the labeled personal data using a sealing key known within TEE 48. This may enable the personal data to be stored in a less costly (or more available) memory environment (e.g., a general database).

For example, in block 455 which may follow, both non-personal data and the personal data (encrypted with the sealing key) may be stored in a database such as memory 46. Using a database, vast amounts of personal data may be stored securely protected with a cryptographic key known to TEE 48.

In block 460, TEE 48 may perform processing using the labeled data (i.e., both the personal and non-personal data). The nature of the data processing may be similar to that described above in block 280 (of process 200—e.g., computer simulation, model training, model testing, etc.); therefore, these aspects will not be re-described here. That said, it should be appreciated that block 280 occurred within an MPC framework, whereas block 460 occurs in the context of a trusted execution environment.

Turning now to FIG. 4C, process 400 may continue. According to one non-limiting example, backend computer 18 also may comprise a trusted execution environment (TEE 68) within its processor (processor 62). Further, TEE 68 may be a subservient enclave to the master enclave of TEE 48. Blocks 465, 470, 475, and 480 are optional and are associated with backend computer 18 having a subservient enclave.

In block 465, remote attestation may occur between the master enclave of TEE 48 and the subservient enclave of TEE 68—so that the subservient enclave can retrieve the personal data using a copy of the sealing key stored within its TEE coupled with a unique signature of the subservient enclave. Attesting a subservient enclave is a known process among subservient and master enclaves and will not be described in great detail here.

In block 470, backend computer 18 may be permitted to access the database of memory 46 so that non-personal data stored in the memory 46 may be duplicated or otherwise stored and used by backend computer 18 (e.g., stored on memory 66 of backend computer 18). Further, block 470 may comprise retrieving the personal data stored on memory 46 which was previously encrypted with the sealing key.

In block 475, TEE 68 may decrypt the personal data using both the sealing key (the same private key used in block 450) plus a signature unique to the subservient enclave. The capability of subservient enclaves to use the sealing key and its unique signature to decrypt data is known and will not be described in detail here.

In block 480, processing of the labeled personal and non-personal data may occur at backend computer 18 as well. In at least some examples, this may be similar to that described in block 460 above.

Figure 5B:
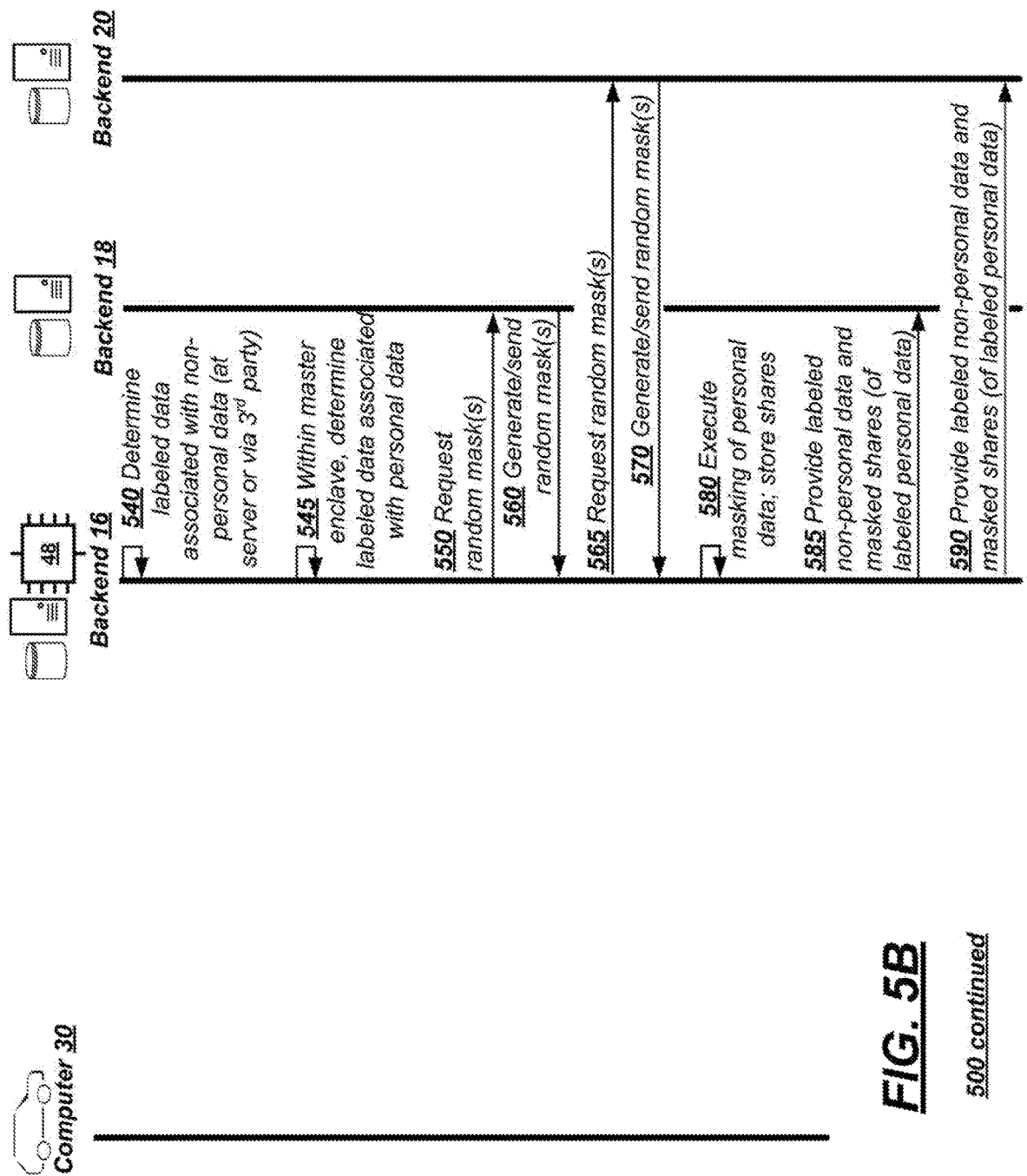
Figure 5C:
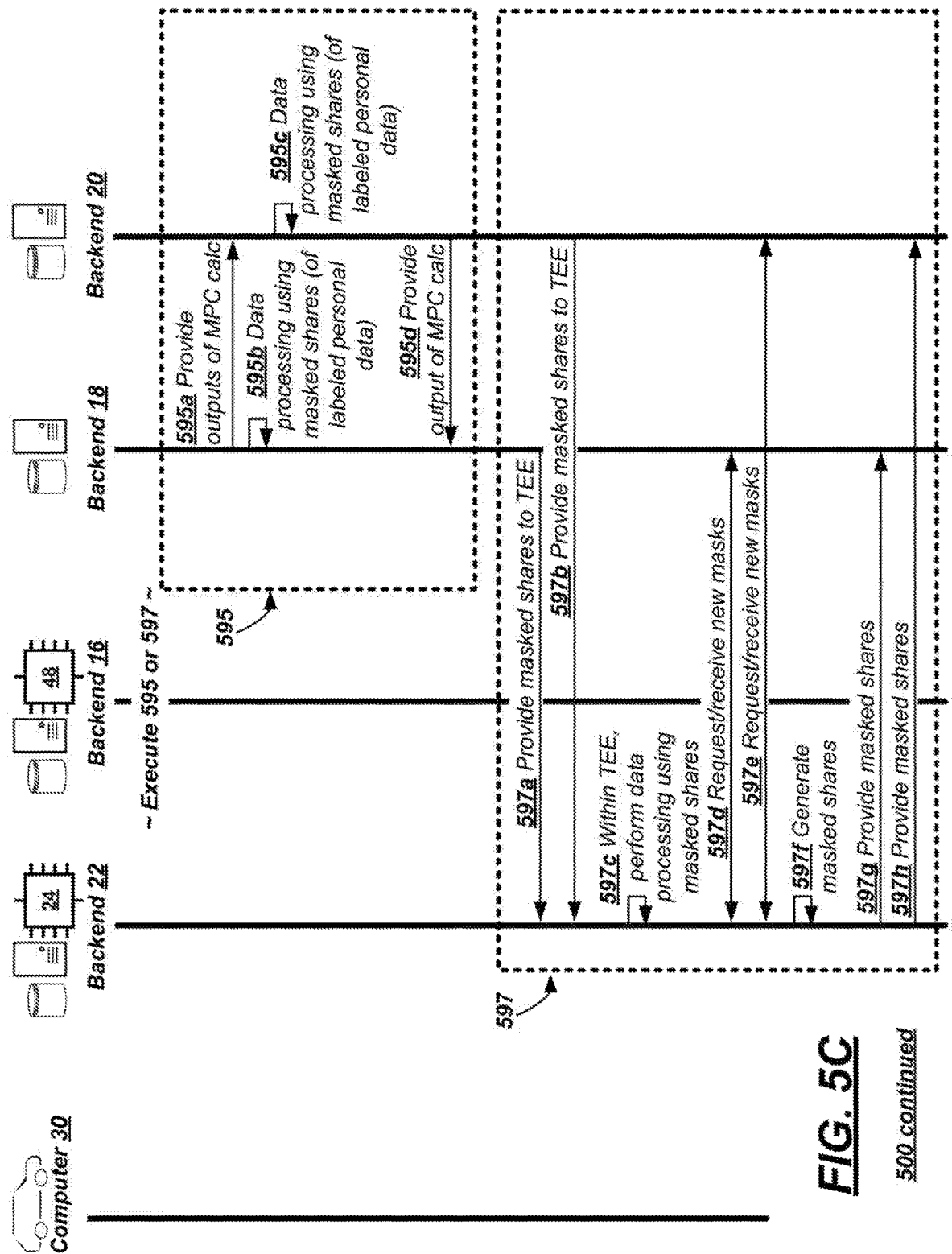

Turning now to FIGS. 5A, 5B, 5C, a process 500 is shown illustrating collecting sensor data and protecting the personal data therein using an MPC framework and a trusted execution environment (TEE) (e.g., a hybrid architecture), wherein computer 30 of vehicle 14 (or backend computer 16 or even backend computer 18) separates the personal data from the non-personal data.

Process 500 may begin with block 505 wherein computer 30 of vehicle 14 receives vehicle sensor data. This maybe similar to block 205, as described above.

Block 510 and block 515 may be similar to blocks 410 and 415, previously described above. These blocks will not be described in detail again. Briefly, in block 510, computer 30 may request a public key from TEE 48, and in block 515, TEE 48 may provide the public key. In at least one embodiment of process 500, TEE 48 is a master enclave that securely stores a private key that corresponds with the public key.

Process 500 may continue by executing either block 520 or block 525. Each will be discussed in turn.

In block 520 (which may comprise block 520a, block 520b, and block 520c), computer 30 may separate personal data from non-personal data. Blocks 520a, 520b, and 520c may correspond to blocks 420a, 420b, and 420c, respectively, as described above. Therefore, these will not be re-described here.

In block 525 (which comprise block 525a and block 525b), computer 30 may encrypt sensor data using the public key provided in block 515. Blocks 525a, 525b may correspond to blocks 425a, 425b, respectively, as described above. Therefore, this will not be re-described here.

Block 530 and optional block 535 maybe similar to blocks 430, 435, respectively—e.g., wherein TEE 48 decrypts the encrypted data and if not previously separated, separates the personal data from the non-personal data. As these blocks may be similar to respective blocks 430, 435, these will not be re-described here.

Turning now to FIG. 5B, block 540 and block 545 may follow. These blocks may be similar or identical to blocks 440 and 445, respectively, wherein the labeled data of the non-personal data is determined (block 540) and within the TEE 48 the labeled data of the personal data is determined. As blocks 540, 545 are similar to blocks 440, 445, respectively, these will not be re-described in detail.

In block 550, processor 42 of backend computer 16 may request from backend computer 18 one or more random masks. And in block 560, in response, backend computer 18 may generate and/or send the requested random masks.

Similarly, in block 565, backend computer 16 may request from backend computer 20 one or more random masks. And in block 570, backend computer 20 may generate and/or send the requested random masks.

In block 580, TEE 48 may execute the masking of the personal data using the random masks received in block 560 and 570. The resulting masked shares of personal data (e.g., a first portion of masked shares and a second portion of masked shares) may be stored (at least temporarily) in memory 44 or 46.

In block 585 which may follow, backend computer 16 may provide to backend computer 18 the labeled, non-personal data (e.g., or provide access thereto). Further, block 585 may comprise providing the first portion of masked shares of labeled personal data to backend computer 18.

Similarly, in block 590, backend computer 16 may provide to backend computer 20 the labeled, non-personal data (e.g., or provide access thereto), and block 590 further may comprise backend computer 16 providing the second portion of masked shares of labeled personal data to backend computer 20.

Turning now to FIG. 5C, process 500 may comprise executing block 595 or block 597, wherein, in block 595, an MPC framework is used for data processing, wherein, in block 597, a subservient TEE is used for data processing. In block 595 (which may comprise blocks 595a, 595b, 595c, 595d), backend computers 18, 20 may perform data processing using the labeled personal data (and using the labeled non-personal data as well). Blocks 595a, 595b, 595c, 595d may be similar to blocks 380a, 380b, 380c, 380d, previously described; therefore, these blocks will not be re-described in detail here. Following block 595, process 500 may end.

In block 597 (which may comprise blocks 597a, 597b, 597c, 597d, 597e, 597f, 597g, 597h), subservient TEE 24 of backend computer 22 may be used for data processing of the personal data. For example, in blocks 597a, 597b, backend computer 18 and backend computer 20 may provide, respectively, a first portion of masked shares (e.g., of labeled personal data) to the TEE 24 and a second portion of masked shares (e.g., of labeled personal data) to the TEE 24. In block 597c, TEE 24 determine the original masked data using both the first and second portions and perform data processing using the personal data therein. In blocks 597d, 597e, TEE 24 may request (and receive) new masks from backend computer 18, 20, respectively. Thereafter, in block 597f, using the new masks, TEE 24 may generate masked shares (e.g., a new first portion and a new second portion). And in blocks 597g, 597h, respectively, a first portion of the masked shares may be provided back to backend computer 18 and a second portion of the masked shares may be provided back to backend computer 20. Thereafter, process 500 may end.

Figure 6B:
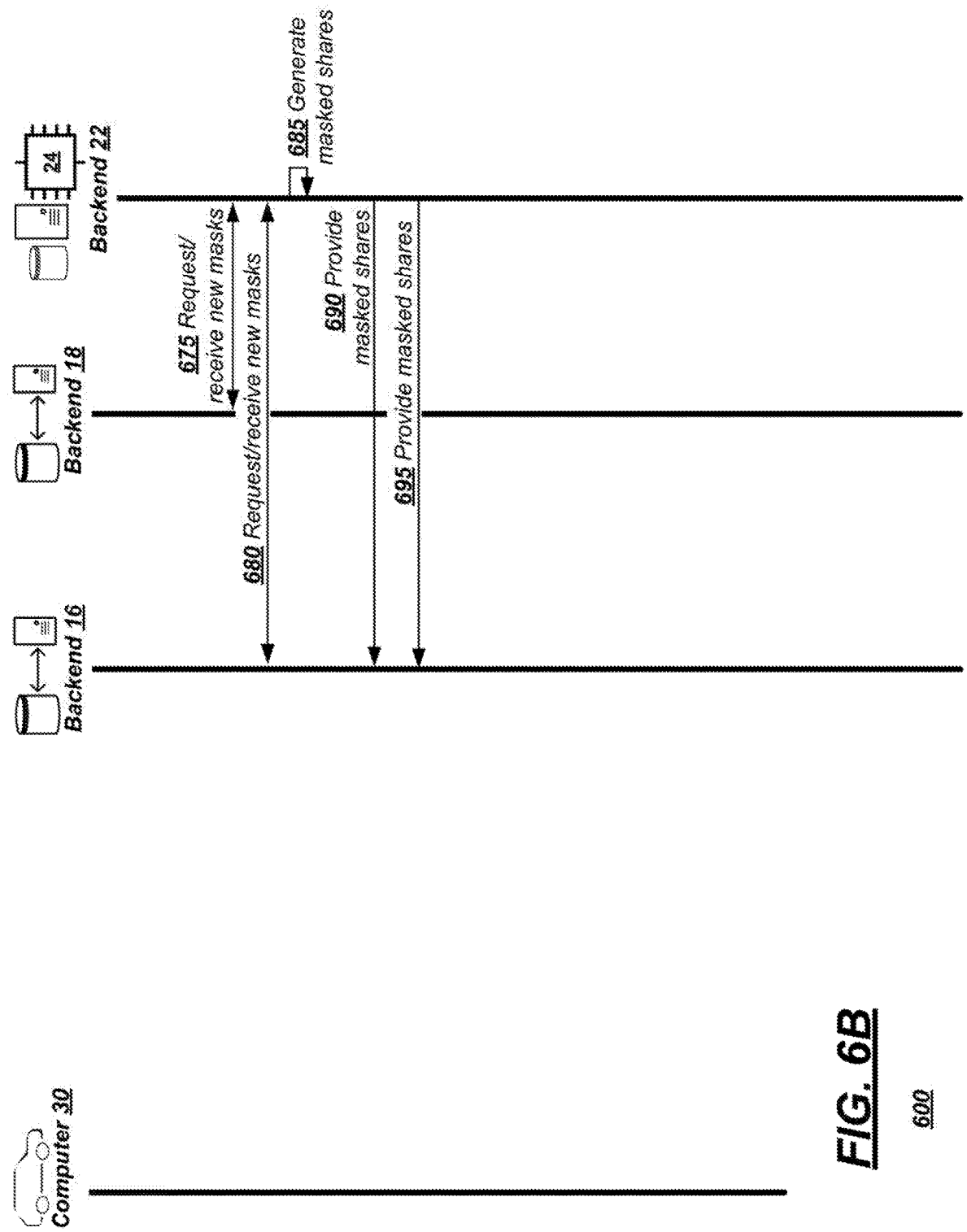

Turning now to FIGS. 6A-6B, a process 600 is shown of another hybrid architecture (e.g., using both an MPC framework and a trusted execution environment. Process 600 may comprise blocks 605, 610, 615, 620, 625, 630, 635, 640, 645, 650, and 655, wherein these blocks may be similar or identical to blocks 205, 210, 215, 220, 225, 230, 235, 240, 245, 250, and 255 (of process 200, FIG. 2). Thus, these blocks will not be re-described here.

In blocks 660, 665 which may follow, backend computers 16, 18 may provide first and second portions of masked shares (respectively) to TEE 24 (e.g., which may comprise a subservient enclave). Within TEE 24, TEE 24 may perform labeling of the personal (and non-personal) data. Further, in block 670, TEE 24 may perform data processing (e.g., similar to block 597c) using the masked shares.

In blocks 675, 680, 685, 690, 695 which may follow, these blocks may be similar to blocks 597d, 597e, 597f, 597d, 597g, 597h, previously described. Therefore, these will not be re-described here.

Turning now to FIG. 7, a process 700 is shown that is applicable to any of processes 200, 300, 400, 500, or 600. Process 700 may begin with block 705. In block 705, computer 30 of vehicle 14 may receive sensor data—e.g., while operating in an autonomous driving mode; this may be similar to block 205 described above.

In block 710, backend computer 16 may determine whether vehicle 14 (more specifically computer 30) is capable of segregating personal data from a remainder of the sensor data collected by sensor(s) 34. Making this determination may occur in a variety of ways. For example, backend computer 16 may simply receive data from computer 30 and determine that the data is not segregated. From this, backend computer 16 may conclude that computer 30 is not capable or suited for segregated personal data from the sensor data. Or for example, computer 30 may explicitly send a message to backend computer 16 informing computer 16 that it does not have the capability (at present) to perform such data segregation or that it does not have the ability to transmit such data via system 40 (at least at present). These are merely examples; other examples of how backend computer 16 may determine a capability of computer 30 also exist. When backend computer 16 determines computer 30 is so-capable, then process 700 proceeds to block 715. And when backend computer 16 determines computer 30 is not so-capable, then process 700 proceeds to block 720.

In block 715, sensor data received by backend computer 16 will comprise personal data separated from non-personal data. And block 725 may follow.

In block 720, sensor data received by backend computer 16 will comprise personal data not separated from non-personal data. And block 725 may follow.

In block 725, backend computer 16 (individually, or in cooperation with backend computer 18) may separate personal data from amongst the sensor data—e.g., identifying the personal data and identifying the non-personal data.

In block 730, process 700 may proceed to block 735 if an MPC framework is utilized, to block 740 if a TEE (e.g., such as TEE 48) is utilized, and to block 745 if both are used. In block 735, backend computers 16, 18 may determine labeling of the personal data and execute data processing using masked shares to maintain security of personal data. In block 740, backend computer 16 may determine labeling of the personal data and execute data processing using a cryptographic key of the TEE 48 to maintain security of personal data. And block 745, one or more backend computers (e.g., such as computer 16) may use a trusted execution environment to determine labeling while two different backend computers (e.g., such as computers 18, 20) may use masked shares for data processing. In this latter example, the MPC framework and the TEE may be used to carry various aspects of separating personal data and data processing. Further, in blocks 740 or 745, in some examples, a master enclave at one backend computer may be used and a subservient enclave at a different backend computer may be used. Following any of blocks 735, 740, or 745, process 700 may end.

Other embodiments of the system 10 also may be used. For example, memories 44, 46 (or memories 64, 66) were described as being suitable for storing masked data or encrypted data (e.g., encrypted with a sealing key). According to at least one example, memories 44 and/or 46 may comprise a data lake. A data lake may refer to a system or repository of data stored in its natural/raw format, usually files or Binary Large OBjects (BLOBs), wherein a BLOB may refer to a collection of binary data stored as a single entity in a database management system (e.g., BLOBs may be images, audio, or other multimedia objects, though sometimes binary executable code is stored as a BLOB). In at least some examples, the data lake is a single store of all enterprise data including raw copies of source system data and transformed (e.g., masked or encrypted) data used for tasks such as reporting, visualization, advanced analytics, and machine learning, wherein the data lake may include structured data from relational databases (rows and columns), semi-structured data (CSV, logs, XML, JSON), unstructured data (emails, documents, PDFs) and binary data (images, audio, video).

Figure 8:
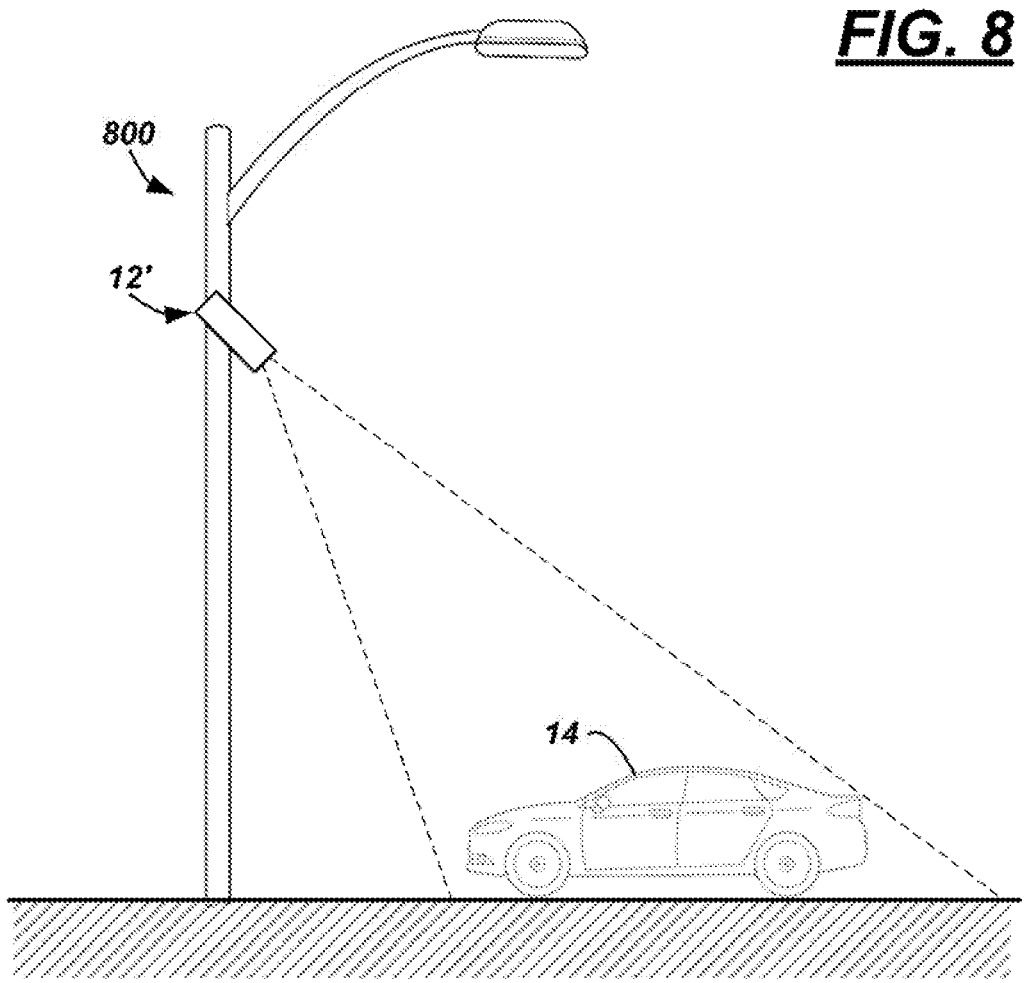
FIG. 8 illustrates another embodiment of a data collection system.

Other examples also exist. For example, in the preceding description, data collection system 12 was embodied in vehicle 14. As previously stated, other examples also exist. For example, turning to FIG. 8, a data collection system 12' may be embodied at least partially in infrastructure 800 (e.g., here a streetlight having a camera sensor and corresponding computer and/or communication system). Here, infrastructure 800 may collect data relevant to vehicle 14 and this data may comprise personal data as well. Other examples (not shown) also exist—e.g., data collection systems may be embodied (additionally or alternatively) as security camera infrastructure, satellite cameras and/or GPS systems, point-of-sale devices, and/or the like.

It should be appreciated that in some instances, data protection system 12, 12' may increase the computational efficiency of system 10. For example, system efficiency improves when system 12, 12' can mask or encrypt the personal data—e.g., as sending an entire set of sensor data can be computationally burdensome on both ends (at system 12, 12' and at system 16).

It should be appreciated that aspects of any of processes 200, 300, 400, 500, 600, or 700 may be used with one another to promote data privacy and compliance with data privacy regulations.

Thus, there has been described a data privacy system that permits large amounts of data to be collected, wherein the system can be used to improve, among other things, autonomous driving systems while at the same time promoting data privacy of information that is considered personal. The data privacy system may comprise a data collector, a data protector, and a data user, wherein the data user processes the collected data without compromising the security of personal data therein. Further, should a data breach occur, any data stolen from the data protector or data use will not disclose one or more natural person's personal data.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of managing data associated with a vehicle, comprising:
providing one or more cryptographic keys to the vehicle from a backend server;
in response to providing the one or more cryptographic keys, receiving, at a first backend computer, sensor data collected by a vehicle, wherein the receiving includes receiving a first portion of encrypted shares of the data and a second portion encrypted shares of the data, wherein the first and second portions each comprise personal data;
determining a labeling of the sensor data, comprising: determining personal data and determining non-personal data that is separated from the personal data, wherein each of the personal and non-personal data comprise labeled data, wherein the personal data comprises information relating to at least one identified or identifiable natural person; and
performing, via the personal data and the non-personal data that is separated from the personal data, data processing associated with collecting sensor data associated with the vehicle, wherein the data processing is performed by communicating with a second backend computer according to a multi-party computation (MPC) framework such that neither of the first or second portions of encrypted shares are shared between the first and second backend computers.

2. The method of claim 1, wherein the sensor data is collected by the vehicle while the vehicle is operating in an autonomous driving mode or is collected by infrastructure associated with the vehicle operating in the autonomous driving mode.

3. The method of claim 1, wherein the personal data comprises image data of the at least one identified or identifiable natural person, wherein the image data is captured by at least one sensor in the vehicle, wherein the image data comprises one or more of: human biometric information of the at least one identified or identifiable natural person, physical features of the at least one identified or identifiable natural person, an address number associated with the at least one identified or identifiable natural person, a license plate number or other vehicle information associated with the at least one identified or identifiable natural person, or neighborhood information associated with the at least one identified or identifiable natural person.

4. The method of claim 1, wherein the sensor data comprises image data that comprises personally identifiable information (PII) of the at least one identified or identifiable natural person.

5. The method of claim 1, wherein receiving sensor data associated with the vehicle further comprises receiving masked sensor data, wherein the masked sensor data comprises both personal data and non-personal data.

6. The method of claim 1, wherein determining the labeling of the sensor data further comprises providing at least a portion of the sensor data to a third party server; and in response to providing the at least a portion of the sensor data to the third party server, receiving sensor data in return that is labeled.

7. The method of claim 1, further comprising:
prior to receiving the sensor data at the first backend computer, providing the vehicle with a second cryptographic key from a trusted execution environment (TEE);
in response to providing the vehicle with the second cryptographic key, receiving at least a portion of the sensor data encrypted with the second cryptographic key; and then,
within the TEE, determining decrypted sensor data.

8. The method of claim 7, further comprising:
before determining the labeling of the sensor data, separating—within the TEE—the personal data from the non-personal data.

9. The method of claim 7, further comprising:
storing the non-personal data in a database;
after determining the decrypted sensor data, encrypting the personal data with a sealing key; and then
storing the personal data encrypted with the sealing key in the database.

10. The method of claim 9, further comprising:
attesting a subservient enclave so that the subservient enclave can retrieve the personal data using a copy of the sealing key stored within its TEE coupled with a unique signature of the subservient enclave.

11. The method of claim 7, wherein the labeling of the sensor data occurs within the TEE.

12. The method of claim 1, wherein:
at least a portion of the sensor data received at the first backend computer is encrypted with a cryptographic key of a trusted execution environment (TEE) within the first backend computer;
after receiving the at least the portion of the sensor data, generating masked shares for a first portion of the sensor data within the TEE and generating masked shares for a second portion of the sensor data within the TEE;
providing the masked shares for the first portion to a second backend computer; and
providing the masked shares for the second portion to a third backend computer so that at least one of the second or third backend computers perform the data processing.

13. The method of claim 1, wherein determining a separation of the personal data from the non-personal data, determining the labeling, or performing the data processing occurs within a trusted execution environment (TEE) associated with a master enclave or a subservient enclave.

14. A first backend computer, comprising:
one or more processors; and
memory storing a plurality of instructions executable by the one or more processors, wherein the plurality of instructions comprise, to:
receive, at the first backend computer, sensor data associated with a vehicle;
determine a labeling of the sensor data, comprising: determining personal data and determining non-personal data that is separated from the personal data, wherein each of the personal and non-personal data comprise labeled data, wherein the personal data comprises information relating to at least one identified or identifiable natural person;

perform via the personal data and the non-personal data that is separated from the personal data, data processing associated with collecting sensor data associated with the vehicle;

prior to receiving the sensor data at the first backend computer, provide the vehicle with a cryptographic key from a trusted execution environment (TEE);

in response to providing the vehicle with the cryptographic key, receive at least a portion of the sensor data encrypted with the cryptographic key; and then, within the TEE, determine decrypted sensor data.

15. The first backend computer of claim 14, wherein the plurality of instructions further comprise, to: request one or more random masks from a second backend computer; request one or more random masks from a third backend computer; execute a first masking of the decrypted sensor data; execute a second masking of the decrypted sensor data; and provide the first masking of the decrypted sensor data to the second backend computer and provide the second masking of the decrypted sensor data to the third backend computer.

16. A method of managing personal data associated with a vehicle, comprising:

receiving, at a first backend computer, sensor data associated with a vehicle;

determining a labeling of the sensor data, comprising: determining personal data and determining non-personal data that is separated from the personal data, wherein each of the personal and non-personal data comprise labeled data, wherein the personal data comprises information relating to at least one identified or identifiable natural person;

performing, via the personal data and the non-personal data that is separated from the personal data, data processing associated with collecting sensor data associated with the vehicle;

prior to receiving the sensor data at the first backend computer, providing the vehicle with a cryptographic key from a trusted execution environment (TEE);

in response to providing the vehicle with the cryptographic key, receiving at least a portion of the sensor data encrypted with the cryptographic key; then, within the TEE, determining decrypted sensor data; and before determining the labeling of the sensor data, separating—within the TEE—the personal data from the non-personal data.

17. The method of claim 16, wherein the sensor data is collected by the vehicle while the vehicle is operating in an autonomous driving mode or is collected by infrastructure associated with the vehicle operating in the autonomous driving mode.

18. The method of claim 16, wherein the personal data comprises image data of the at least one identified or identifiable natural person, wherein the image data is captured by at least one sensor in the vehicle, wherein the image data comprises one or more of: human biometric information of the at least one identified or identifiable natural person, physical features of the at least one identified or identifiable natural person, an address number associated with the at least one identified or identifiable natural person, a license plate number or other vehicle information associated with the at least one identified or identifiable natural person, or neighborhood information associated with the at least one identified or identifiable natural person.

19. The method of claim 16, wherein the sensor data comprises image data that comprises personally identifiable information (PII) of the at least one identified or identifiable natural person.

20. The method of claim 16, further comprising:

providing one or more random masks to the vehicle;

in response to providing the one or more random masks, receiving a first portion of masked shares and a second portion masked shares, wherein the first and second portions each comprise personal data; and following receiving the first and second portions of masked shares, performing the data processing by communicating with a second backend computer according to a multi-party computation (MPC) framework such that neither of the first or second portions of masked shares are shared between the first and second backend computers.

* * * * *